United States Patent
Yamauchi et al.

(10) Patent No.: US 7,266,368 B2
(45) Date of Patent: Sep. 4, 2007

(54) METHOD AND APPARATUS FOR PRESENTING ASSISTANCE DATA IN A COMMUNICATION CONFERENCE SYSTEM

(75) Inventors: Hitoshi Yamauchi, Kawasaki (JP); Masanobu Morinaga, Kawasaki (JP); Hideaki Miyazaki, Kawasaki (JP); Ai Yano, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 10/742,939

(22) Filed: Dec. 23, 2003

(65) Prior Publication Data

US 2004/0145652 A1    Jul. 29, 2004

(30) Foreign Application Priority Data

Jan. 29, 2003   (JP)  ............................. 2003-021074

(51) Int. Cl.
 *H04M 3/42*   (2006.01)
 *H04N 7/14*   (2006.01)
 *H04L 12/16*  (2006.01)

(52) U.S. Cl. ...................... 455/416; 455/463; 455/355; 348/14.08; 379/202.01; 370/260; 370/263; 370/265

(58) Field of Classification Search ................ 455/416, 455/355; 348/14.08, 14.09; 379/202.01; 370/260–269
See application file for complete search history.

(56) References Cited

U.S. PATENT DOCUMENTS 5,732,216 A * 3/1998 Logan et al. ............... 709/203
5,916,302 A * 6/1999 Dunn et al. ................ 709/204
6,008,838 A * 12/1999 Iizawa ...................... 348/14.09
6,606,111 B1 * 8/2003 Kondo et al. ............. 348/14.01
6,693,661 B1 * 2/2004 Vanderwilt et al. ...... 348/14.01
7,065,198 B2 * 6/2006 Brown et al. ........... 379/202.01
2004/0008249 A1 * 1/2004 Nelson et al. ........... 348/14.09

FOREIGN PATENT DOCUMENTS

| JP | 5-347666 | 12/1993 |
|---|---|---|
| JP | 11-355747 | 12/1999 |
| JP | 2000-49948 | 2/2000 |
| JP | 2002-368866 | 12/2002 |

OTHER PUBLICATIONS

Japanese Office Action mailed Oct. 18, 2005 in Japanese patent application No. 2003-021074 corresponding to the present above identified U.S. Patent Application (2 pages) including English language translation thereof (1 page).

* cited by examiner

*Primary Examiner*—Duc M. Nguyen
(74) *Attorney, Agent, or Firm*—Staas & Halsey LLP

(57) ABSTRACT

The present invention provides a communication assistance process that is performed by a communication assistance device connected to a plurality of user terminals via a network. During a communication (or video) conference call, when assistance data associated with a topic in the conference is provided to a plurality of user terminals in the form of a voice data, the communication assistance process adjusts the sound volume of voice data in the assistance data if it was determined that voice data is included in the communication data received from the plurality of user terminals, and if voice data is also included in the assistance data, the assistance data that includes sound volume adjusted voice data is then provided to the plurality of user terminals. Accordingly, the communication assistance process allows communications in a conference system to proceed smoothly.

15 Claims, 20 Drawing Sheets

METHOD AND APPARATUS FOR PRESENTING ASSISTANCE DATA IN A COMMUNICATION CONFERENCE SYSTEM

BACKGROUND OF THE INVENTION

1. Field of the Invention

The present invention relates to a communication assistance process and a communication assistance device for a plurality of user terminals connected via a network. In the present invention, e-mail and chat communications include voice data, text data, and image data, and image data includes still images and moving images. In addition, the term "text e-mail" is defined to mean text-based e-mail, and the term "voice e-mail" is defined to mean voice-based e-mail. Likewise, the term "text chat" is defined to mean text-based chat, and the term "voice chat" is defined to mean voice-based chat.

2. Background Information

In a video conference system, a plurality of user terminals such as personal computers, cameras, or the like are connected to a server that integrates these user terminals together. A video conference system employs technology that allows a meeting to be smoothly conducted by reading out stored data associated with a statement made at a meeting from a server and displaying that stored data on the screens of user terminals. For example, data associated with a meeting may be stored on the server in advance, or a statement input from a user terminal may be stored on the server during the course of a meeting. Then, data and/or previously made statements that were stored in advance on the server are read out from the server in response to a statement from one of the user terminals and displayed on the screens of the user terminals. This allows a meeting to be efficiently conducted by selecting and suitably displaying data associated with a topic being discussed during the meeting (see for example Japanese Published Unexamined Patent Application No. H05-347666).

In addition, a video conference system has been disclosed in which identifiers are attached to images and the images are then registered in advance., and when one of these identifiers are input or a statement associated with one of these identifiers is spoken during a meeting, the image associated with the identifier will be displayed (see for example Japanese Published Unexamined Patent Application No. H11-355747).

Furthermore, a chat system sometimes provides supplementary services such as an auto-response service which automatically responds with text chat. Here, the chat system is composed of a chat server connected via a network to a plurality of chat clients. In this chat system, a virtual conversation space established on a network, commonly referred to as a channel, is shared by a plurality of chat clients, and messages can be sent and received therein in real time. In addition, a text chat auto-response service is one in which a device that provides the auto-response service participates with the chat client in a chat room. When a keyword is transmitted from a user terminal to the chat room, the device will conduct a search based upon that keyword and transmit the search results to the chat room. Examples of this type of auto-response service include a stock price service that provides the stock price of a company specified in a chat by displaying the stock price on the screens of the user terminals, a service that informs users of the train schedules for a particular train station, a service that transmits specified keywords to a WWW (World Wide Web) search page and informs users of the URLs (Uniform Resource Locator) associated with the keywords, and the like. This type of auto-response service will allow users to carry out an uninterrupted conversation in a chat room.

However, one problem with the technology and the auto-response service disclosed in the prior art noted above is that when the data provided in response to a statement made during a meeting is in the form of voice data, voice communications between the user terminals will be interrupted when the voice data is provided to the user terminals. For example, the user terminals in a video conference system normally include a function which receives voice data from a plurality of user terminals. Because of that, when data associated with a topic in a video conference is provided to the user terminals in the form of voice data, there will be occasions in which voice communications between the user terminals will overlap with the voice data. Thus, it will be difficult to hear voice communications between the user terminals, and the meeting will not proceed smoothly.

Network speeds have increased in recent years, and thus it is assumed that communications between user terminals will not only be in the form of text data and/or image data, but that the use of video conference systems using voice data will accelerate. For example, voice services such as ticket reservations for airlines and the line, train transfer information, lodging information, medical care information, horoscopes, weather forecasts, and the like continue to be developed, and it is thought that these services will be used on video conference systems. Furthermore, services that use shared XML data which employ Voice XML (Voice extensible Markup Language) to provide WWW search services continue to be developed. Thus, in the future, there will be increased demand for technology that not only allows voice communications to be smoothly carried out between user terminals, but also allows voice communications between a service provider and user terminals to be smoothly carried out.

Accordingly, an object of the present invention is to provide technology in a communication system that allows communications to proceed smoothly.

SUMMARY OF THE INVENTION

According to a first aspect of the present invention, a communication assistance process is performed by a communication assistance device connected to a plurality of user terminals via a network, and includes the steps of:

receiving communication data transmitted from the plurality of user terminals;

acquiring assistance data that serves to assist communication between the plurality of user terminals;

determining whether or not voice data is included in the received communication data;

determining whether or not voice data is included in the assistance data;

adjusting the sound volume of voice data in the assistance data if it was determined in the communication data determination step that voice data is included in the communication data received from the plurality of user terminals, and it was determined in the assistance data determination step that voice data is included in the assistance data; and providing assistance data that includes sound volume adjusted voice data to the plurality of user terminals.

In the first aspect of the present invention, the sound volume of the assistance data is adjusted and then provided to the user terminals based upon whether or not voice communication is occurring between the user terminals and whether or not the assistance data includes voice data.

Because of that, when the assistance data provided to the user terminals includes voice data, interruptions to the voice communication between the user terminals can be reduced while providing assistance data to the user terminals. Thus, a discussion can proceed smoothly between the user terminals and the quality of the discussion therebetween can be increased while effectively sharing assistance data. When the assistance data does not include voice data, the assistance data can be provided to the user terminals in the form of text data or image data.

According to a second aspect of the present invention, the communication assistance process of the first aspect further includes the steps of:

storing a vocabulary list; and comparing the vocabulary list stored in the vocabulary list storage step with the communication data received in the communication data receiving step, and extracting one or more keywords that are included in the vocabulary list from the communication data;

wherein assistance data that is associated with one or more keywords extracted in the keyword extraction step is acquired in the assistance data acquisition step.

In the second aspect of the present invention, the user terminals can receive assistance data in accordance with the content of the communication between the user terminals, and thus the quality of the discussion between the user terminals can be further improved.

According to a third aspect of the present invention, the communication assistance process of the second aspect further includes the steps of:

calculating an occurrence frequency of each keyword extracted in the keyword extraction step; and extracting keywords having a high occurrence frequency from the keywords that had their occurrence frequency calculated in the frequency calculation step;

wherein assistance data associated with the keywords having a high occurrence frequency is acquired from amongst assistance data associated with the keywords extracted in the keyword extraction step.

In the third aspect of the present invention, efficient communication between the user terminals can be promoted by matching assistance data thought to be useful with keywords having a high occurrence frequency.

According to a fourth aspect of the present invention, the communication assistance process of the second aspect further includes the step of matching and storing the keywords included in the vocabulary list with the assistance data, wherein the assistance data acquisition step includes searching for and retrieving assistance data that corresponds to the keywords extracted in the keyword extraction step.

According to a fifth aspect of the present invention, the assistance data of the communication assistance process of the first aspect is stored in a computer terminal which is connected to the network, and the assistance data is acquired from the computer terminal in the assistance data acquisition step.

According to a sixth aspect of the present invention, in the communication assistance process of the first aspect, assistance data that includes text data and/or image data is provided to the user terminals in the assistance data provision step if it was determined in the assistance data determination step that the assistance data does not include voice data.

According to a seventh aspect of the present invention, in the communication assistance process of the first aspect, the sound volume of voice data in the communication data is measured in the communication data determination step, and the sound volume of voice data in the assistance data is adjusted in the sound volume adjustment step in response to the measurement results of the sound volume measurement step.

In the seventh aspect of the present invention, interruptions to voice communication between the user terminals due to the assistance data can be reduced. For example, if the measured sound volume is low, interruptions to the voice communication can be reduced by providing the assistance data at a sound volume lower than the measured sound volume.

According to an eighth aspect of the present invention, the communication assistance process of the first aspect further includes a first degree of association evaluation step in which the degree of association between the communication data received from the plurality of user terminals and the assistance data is evaluated; and the sound volume of voice data in the assistance data to be provided to the plurality of user terminals is adjusted in the sound volume adjustment step in response to the evaluation results of the first degree of association evaluation step.

According to a ninth aspect of the present invention, the communication assistance process of the first aspect further includes a second degree of association evaluation step in which the degree of association between the communication data received from the plurality of user terminals and the assistance data is evaluated for each user terminal; and the sound volume of voice data in the assistance data is adjusted in the sound volume adjustment step for each user terminal in response to the evaluation results of the second degree of association evaluation step.

In the ninth aspect of the present invention, assistance data can be effectively provided in response to the degree of interest to the assistance data for each terminal. For example, if the degree of association between a certain user terminal and the assistance data is higher than with other user terminals, the sound volume for the assistance data provided to that user terminal will be increased. On the other hand, if the degree of association between another user terminal and assistance data is low, the sound volume of the assistance data provided to that user terminal will be lowered.

According to a tenth aspect of the present invention, the communication assistance process of the ninth aspect further includes the steps of:

storing a vocabulary list; and comparing the vocabulary list stored in the vocabulary list storage step with the communication data received in the communication data receiving step, and extracting one or more common keywords included in the communication data from each of the plurality of user terminals and the vocabulary list;

wherein the degree of association with the assistance data is evaluated in the second degree of association evaluation step based upon the transmission order of the common keywords from each user terminal; and the assistance data acquired in the assistance data acquisition step is associated with the common keywords extracted in the common keyword extraction step.

In the tenth aspect of the present invention, when the degree of association between each user terminal and the assistance data is determined by the order in which common keywords were transmitted from each user terminal, the degree of association can be automatically evaluated and the sound volume can be adjusted. For example, if assistance data associated with the common keywords is to be provided to the user terminal that was the first to transmit the common keywords, the assistance data will be provided at a sound volume higher than that provided to the other user terminals.

According to an eleventh aspect of the present invention, the communication assistance process of the ninth aspect further includes the steps of:

storing a vocabulary list; and comparing the vocabulary list stored in the vocabulary list storage step with the communication data received in the communication data receiving step, and extracting one or more common keywords included in the communication data from each of the plurality of user terminals and the vocabulary list; and calculating the transmission frequency of the common keywords for each user terminal;

wherein the degree of association with the assistance data is evaluated in the second degree of association evaluation step based upon the transmission frequency of the common keywords; and the assistance data acquired in the assistance data acquisition step is associated with the common keywords extracted by the common keyword extraction step.

In the eleventh aspect of the present invention, the degree of association for each user terminal may also be determined by means of the transmission frequency of the common keywords transmitted from each user terminal. For example, the transmission frequency of the common keywords will be calculated for each user terminal, and the assistance data will be provided to each user terminal at a sound volume in proportion to the transmission frequency. This allows the sound volume to be adjusted in response to the degree that each user terminal needs the assistance data.

According to a twelfth aspect of the present invention, a communication assistance device is connected to a plurality of user terminals, and includes:

receiving means that receives communication data transmitted from the plurality of user terminals;

assistance data acquisition means that acquires assistance data that serves to assist communication between the plurality of user terminals;

communication data determination means that determines whether or not voice data is included in the received communication data;

assistance data determination means that determines whether or not voice data is included in the assistance data;

sound volume adjustment means that adjusts the sound volume of voice data in the assistance data if it was determined in the communication data determination means that voice data is included in the communication data received from the plurality of user terminals, and it was determined in the assistance data determination means that voice data is included in the assistance data; and assistance data provision means that provides assistance data that includes sound volume adjusted voice data to the plurality of user terminals.

In the twelfth aspect of the present invention, the communication assistance device executes the process according to the first aspect of the present invention.

According to a thirteenth aspect of the present invention, a communication assistance program is executed by a computer connected to a plurality of user terminals, and the communication assistance program causes the computer to function as:

receiving means that receives communication data transmitted from the plurality of user terminals;

assistance data acquisition means that acquires assistance data that serves to assist communication between the plurality of user terminals;

communication data determination means that determines whether or not voice data is included in the received communication data;

assistance data determination means that determines whether or not voice data is included in the assistance data;

sound volume adjustment means that adjusts the sound volume of voice data in the assistance data if it was determined in the communication data determination means that voice data is included in the communication data received from the plurality of user terminals, and it was determined in the assistance data determination means that voice data is included in the assistance data; and assistance data provision means that provides assistance data that includes sound volume adjusted voice data to the plurality of user terminals.

In the thirteenth aspect of the present invention, the program instructs a computer to execute the process according to the first aspect of the present invention.

According to a fourteenth aspect of the present invention, a computer readable storage medium has a communication assistance program stored thereon that is executed on a computer connected to a plurality of user terminals via a network, the program executing the steps of:

receiving communication data transmitted from the plurality of user terminals;

acquiring assistance data that serves to assist communication between the plurality of user terminals;

determining whether or not voice data is included in the received communication data;

determining whether or not voice data is included in the assistance data;

adjusting the sound volume of voice data in the assistance data if it was determined in the communication data determination step that voice data is included in the communication data received from the plurality of user terminals, and it was determined in the assistance data determination step that voice data is included in the assistance data; and providing assistance data that includes sound volume adjusted voice data to the plurality of user terminals.

In the fourteenth aspect of the present invention, the storage medium stores the communication assistance program according to the thirteenth aspect of the present invention. In addition, examples of the storage medium include computer readable floppy disks, hard disks, semiconductor memories, CD-ROMs, DVDs, magneto-optical disks, and the like.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Summary of the Invention

A summary of a communication assistance process of the present invention will be described, the process employing a voice conference system in which voice communication is performed by means of user terminals such as a telephone, a microphone, or the like.

Figure 1:
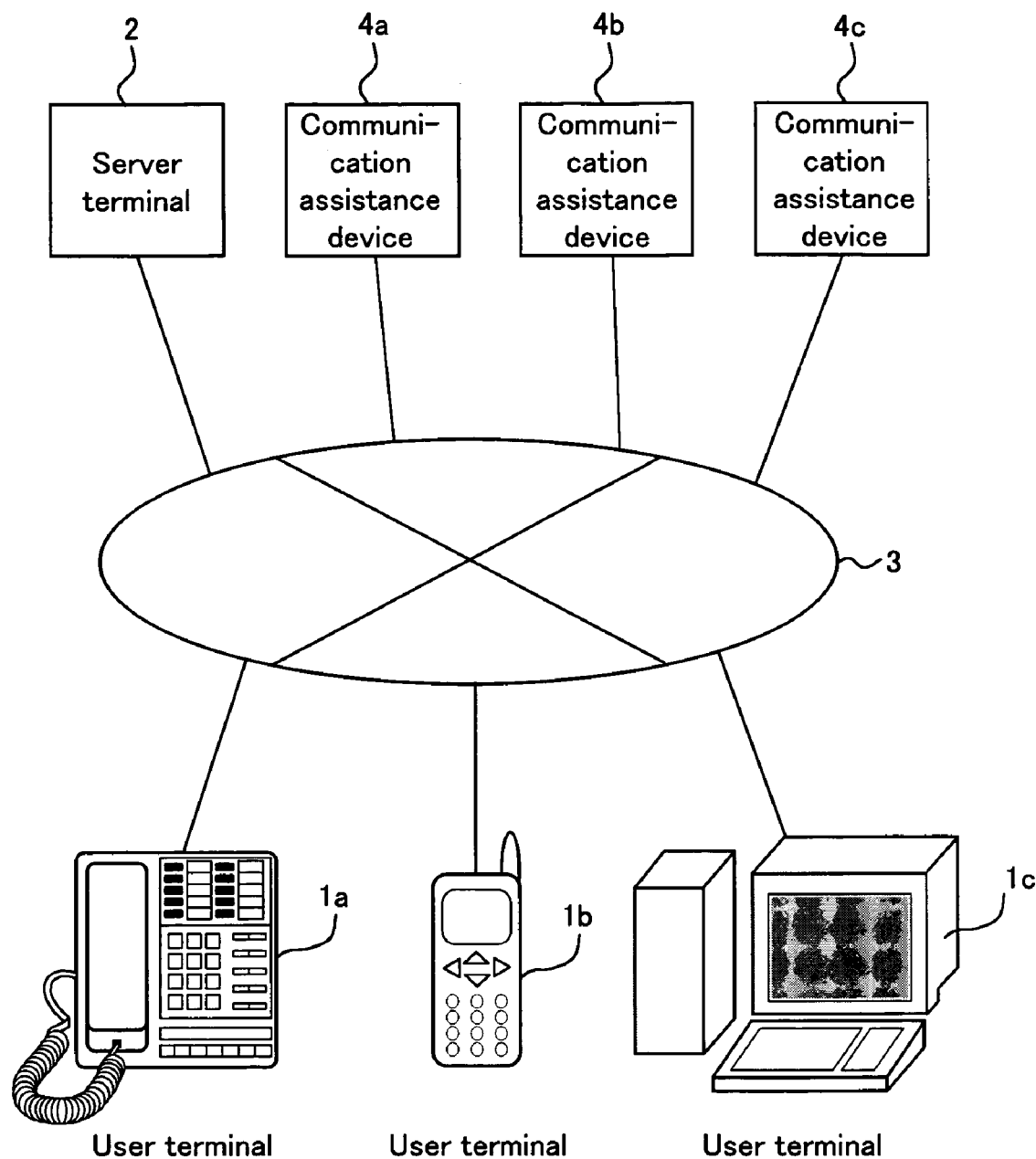
FIG. 1 shows the configuration of a voice conference system of the present invention.
Figure 2:
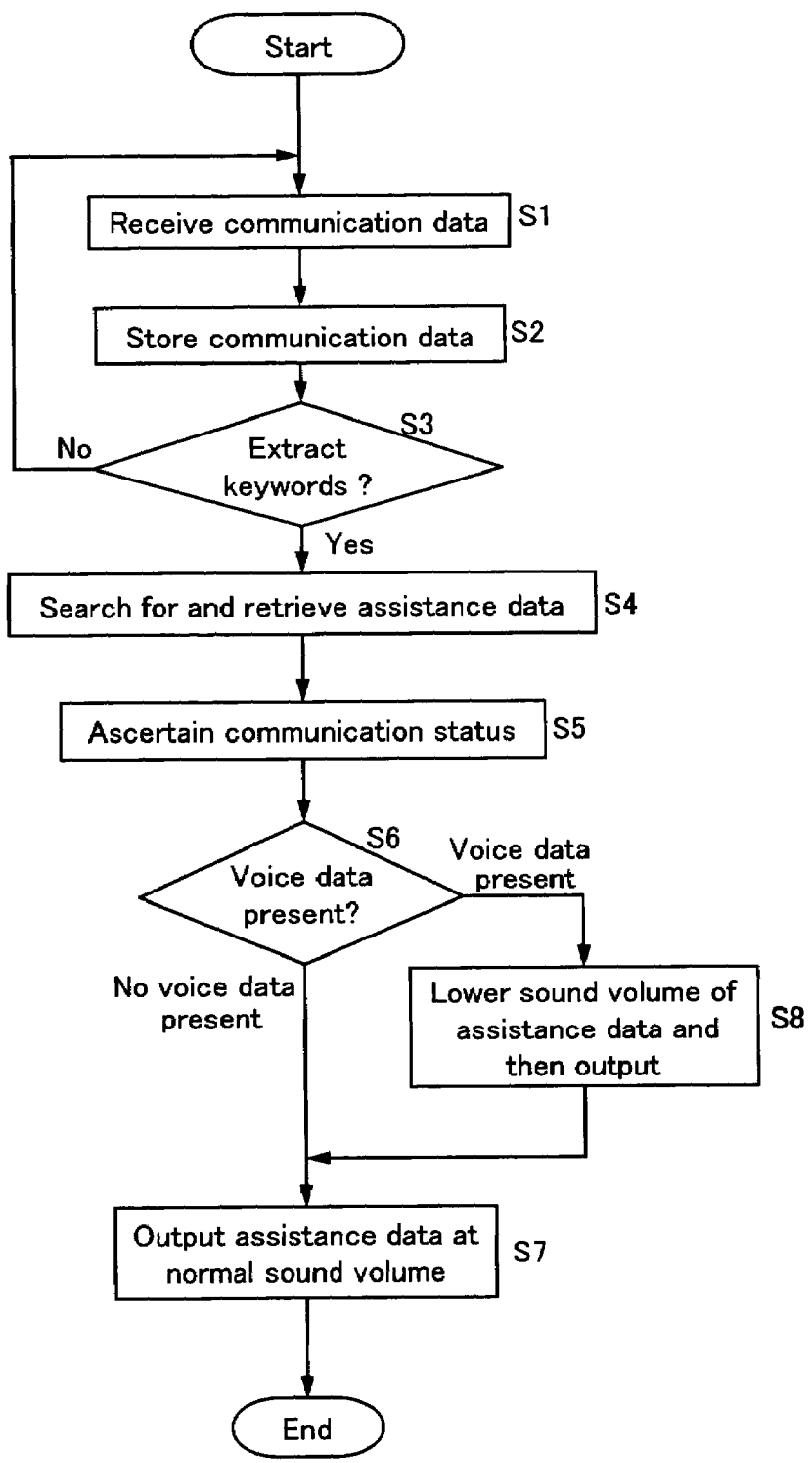
FIG. 2 is a flowchart showing an example of a communication assistance process in the voice conference system of FIG. 1.

FIG. 1 shows the configuration of the voice conference system of the present invention, and FIG. 2 is a flowchart showing an example of the communication assistance process in the voice conference system of FIG. 1.

(1) Configuration

First, the configuration of the voice conference system will be described. In the voice conference system of FIG. 1, a plurality of user terminals 1 (1a, 1b, 1c, etc.), a server 2, and one or more communication assistance devices 4 (4a, 4b, 4c) are connected together via a network 3. The server 2 manages data on the users connected thereto, as well as voice conference system data that allows voice communications to be performed between the user terminals 1. In addition, the communication assistance devices 4 search for data associated with the voice communications between the user terminals 1, and provide the search results to the user terminals 1 by means of voice data. Here, the search results are data associated with communication data (voice communications) between the user terminals 1, and will hereinafter be referred to as assistance data. The user terminals 1 can smoothly carry out a meeting by referring to the assistance data, and thus the quality of the discussion can be improved.

(2) Process Flow

Next, the communication assistance process of the communication assistance devices 4 that provide assistance data to the user terminals will be briefly described with the flowchart in FIG. 2. Each communication assistance device 4 is comprised of a database (hereinafter referred to as a keyword DB) that stores a vocabulary list.

Step S1: The communication assistance device 4 receives communication data (voice communications) via the network 3 that is carried out between the user terminals 1.

Step S2: The communication assistance device 4 converts and stores the received communication data into, for example, text data that can be handled as text strings, and produces a database (hereinafter referred to as a text DB) that is related to the communication data.

Step S3: The text DB produced in Step S2 is compared to the keyword DB, and the matching keywords are extracted from the communication data between the user terminals 1. For example, the communication data generated during a fixed period of time is stored in the text DB, and the number of times each keyword appears in the text DB is calculated. Then, the keywords that appear a fixed number of times or greater may be extracted. In addition, a database (hereinafter referred to as an associated keyword DB) that stores only keywords that may be associated with the communication data between the user terminals 1 may serve as the keyword DB. The associated keyword DB may then be compared with the text DB, and any matching keywords may be extracted from the communication data. By producing an associated keyword DB, keywords that retrieve more useful assistance data can be efficiently extracted.

Step S4: When the keywords are extracted in Step S3, the communication assistance device 4 performs a search, based upon the extracted keywords, for assistance data that matches the users' communication data. The assistance data here is assumed to be only voice data because a voice conference is being carried out in this example. The communication assistance device 4, for example, searches for assistance data in an assistance data database (hereinafter referred to as assistance data DB) pre-stored inside the communication assistance device 4. The assistance data in the assistance data DB is, for example, associated with the keywords in the keyword DB or the associated keyword DB.

In the alternative, a wide range of assistance data can be acquired if the assistance data is retrieved from a computer terminal on the network 3 other than the communication assistance device 4, e.g., from a WWW server on the Internet.

Step S5: The communication assistance device 4 ascertains the communication status of the user terminals 1, such as whether or not communication is taking place between the user terminals 1, in order to provide the assistance data obtained in Step S4 to the user terminals 1. The communication status may, for example, be ascertained by measuring the sound volume between the user terminals 1. In addition, if the communication status of the server 2 and the communication assistance devices 4 are also ascertained, the communication status of all of the terminals connected to the network 3 will be collected and thus assistance data can be provided thereto. For example, when some type of data is provided from the server 2 or the communication assistance device 4 to the user terminals 1, measures can be taken such as adjusting the sound volume of the assistance data if the communication data is voice communication.

Step S6: Whether or not voice communication is being carried out is determined based upon the communication status ascertained in Step S5.

Step S7: If it is determined in Step S6 that voice communication is not being carried out, assistance data will be provided to the user terminals 1 at a normal sound volume or at a sound volume that has no relationship with the normal sound volume.

Step S8: If it is determined in Step S7 that voice communication is being carried out, the assistance data will be provided at a sound volume lower than the normal sound volume. The sound volume of the assistance data may be compared to the sound volume of the voice communication between the user terminals 1, and the assistance data may be provided at a sound volume that is lower than the sound volume of the voice communication.

In this way, if assistance data comprised of voice data is to be provided to the user terminals 1, by ascertaining the communication status of the user terminals 1, and changing the sound volume of the assistance data in response to the communication status of the user terminals 1 and then providing the assistance data thereto, interruptions to voice communication between user terminals 1 by the assistance data can be reduced while simultaneously providing assistance data to a plurality of users. Thus, a discussion can proceed smoothly between user terminals 1 and the quality of the discussion therebetween can be increased while effectively sharing assistance data.

First Embodiment

Figure 3A:
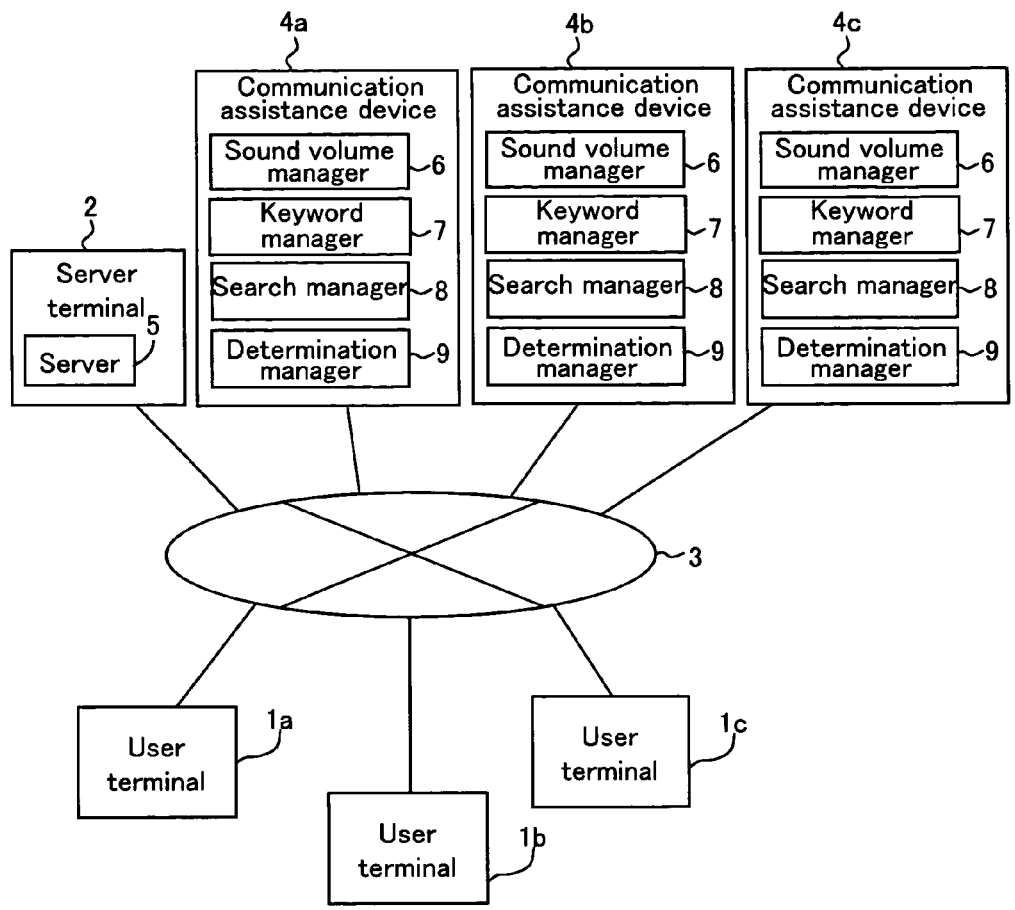
FIG. 3A shows the configuration of a video conference system according to a first embodiment of the present invention.
Figure 3B:
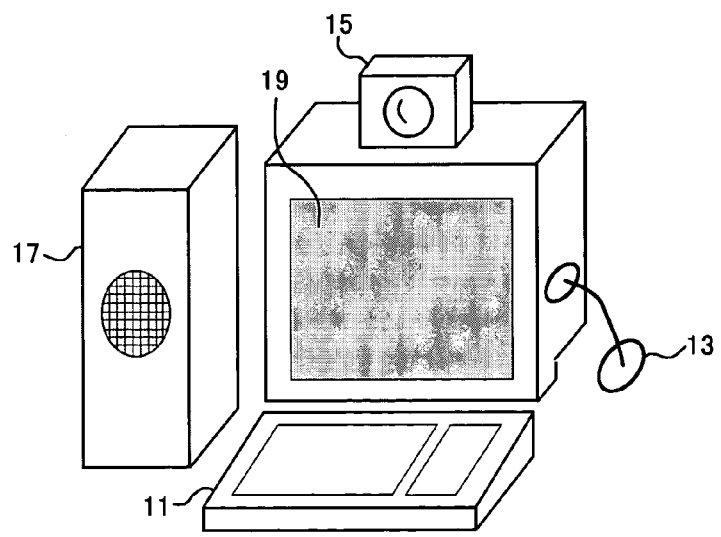
FIG. 3B shows an example of a user terminal employed in the first embodiment of the present invention.

FIG. 3A shows the configuration of a video conference system according to a first embodiment of the present invention, and FIG. 3B shows an example of a user terminal.

The video conference system of FIG. 3A is identical to the voice conference system of FIG. 1, and includes a plurality of user terminals 1 (1a, 1b, 1c, etc.), a server terminal 2, and one or more communication assistance devices 4 (4a, 4b, 4c, etc.) connected together via a network 3. A server 5 is included in the server terminal 2, and manages data on the users connected to the network 3 as well as the state of the video conference system so that communication is carried out between the user terminals 1 by means of voice data, text data, and image data. In addition, each communication assistance device 4 includes a sound volume manager 6, a keyword manager 7, a search manager 8, and a determination manager 9. The volume manager 6 adjusts the sound volume of the assistance data provided to the user terminals 1, the keyword manager 7 extracts the keywords in the communication data between the user terminals 1, the search manager 8 searches the assistance data based upon the extracted keywords, and the determination manager 9 determines whether or not the assistance data includes sound data. Each communication assistance device 4 conducts searches based upon keywords transmitted from the user terminals 1, and provides assistance data (the search results) to the user terminals 1 by means of sound data, text data, and image data. The user terminals 1 can smoothly carry out a meeting by referring to the assistance data, and thus the quality of the discussion can be improved.

FIG. 3B is an example of a user terminal 1 in the video conference system, and is comprised of input/output equipment such as a keyboard 11 for text data input, a microphone 13 for sound data input, a camera 15 for image data input, a speaker 17 for sound data output, a display 19 for image data output, and the like, and serves to enable communication by means of sound data, text data, and image data.

Figure 4:
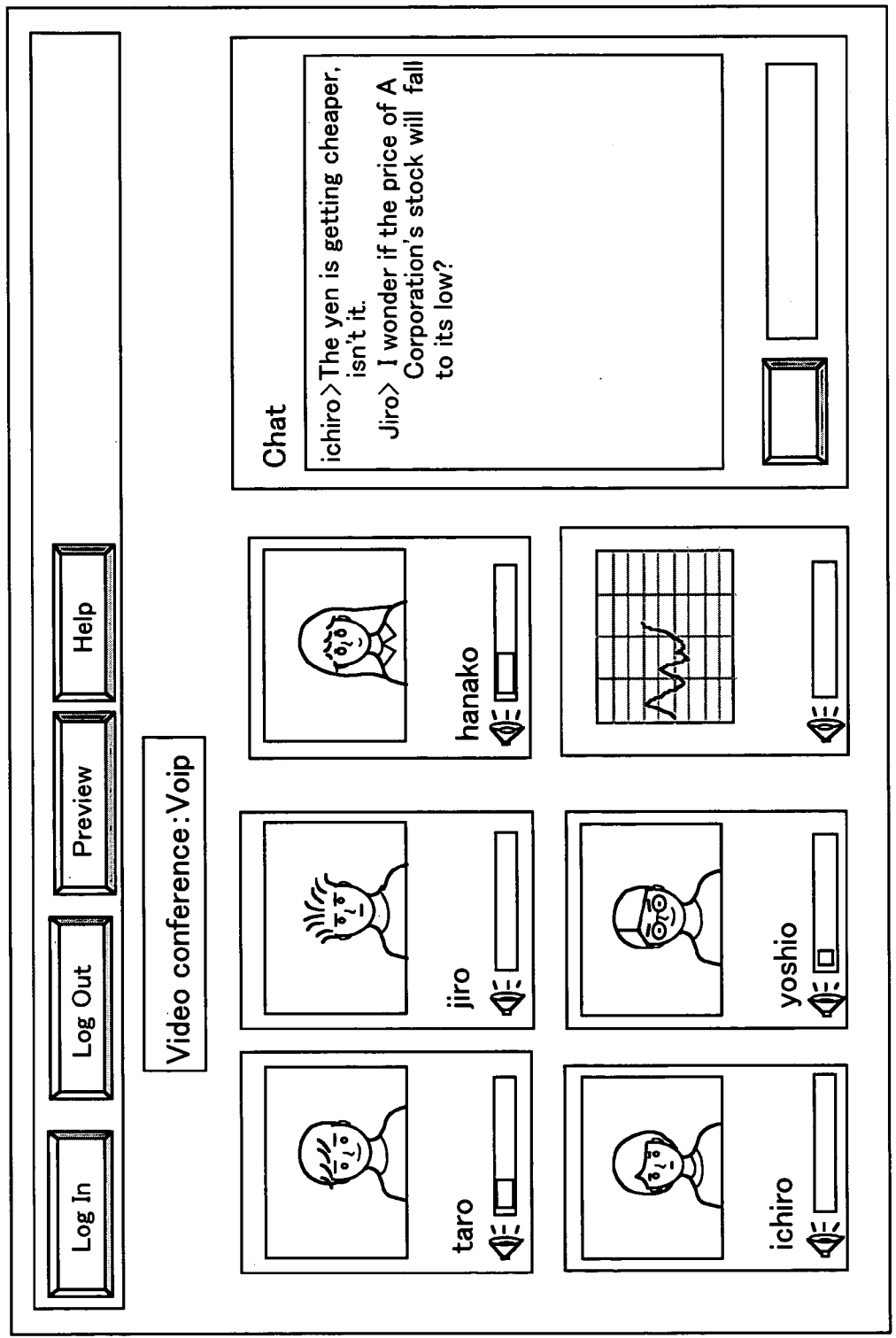
FIG. 4 shows an example of a display screen of a display of the user terminal of FIG. 3B.

FIG. 4 is an example of what will be displayed on the display 19 of this type of user terminal. A discussion is displayed on the display 19 by means of text and the images of the users that are using each user terminal 1 connected to the network 3.

The specific configuration of the server terminal 2 and the communication assistance devices 4 in the video conference system according to the first embodiment will be described below.

(1) Configuration (1-1) Configuration of the Server Terminal

Figure 5:
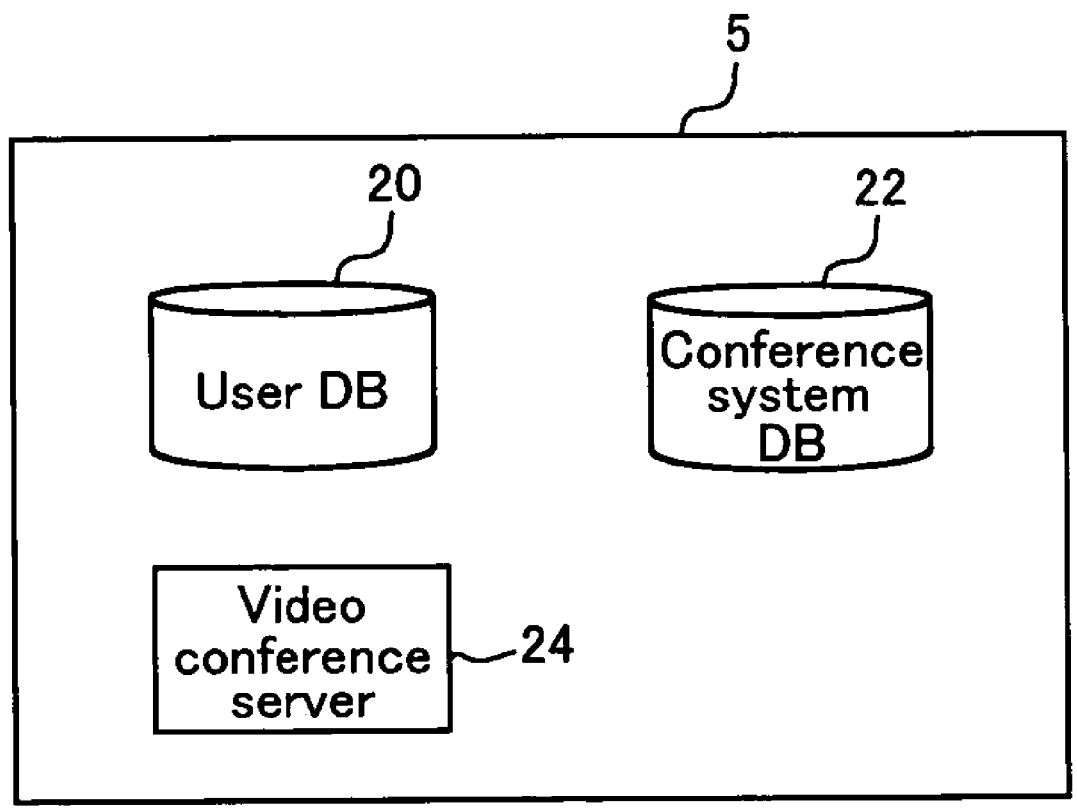
FIG. 5 shows an example of the configuration of a server in a server terminal employed in the first embodiment of the present invention.

First, the server 5 will be described. FIG. 5 is an example of the configuration of the server 5 inside the server terminal 2. The server 5 includes, for example, a user DB 20 that stores the user names, user IDs, and the like of the user terminals 1 connected to the network 3, and a conference system DB 22 that manages data on the video conference system in order to conduct video conferences between the user terminals 1. The server 5 uses this data to manage the video conference system made up of terminals such as the user terminals 1 connected via the network 3. In addition, the server 5 includes a video conference server 24 that serves to conduct video conferences. Furthermore, a chat server and/or an e-mail server may be provided in order to carry out communication by means of voice/text chat or voice/text e-mail. The chat server and/or the e-mail server may be included in the video conference server 24.

(1-2) Configuration of the Communication Assistance Device

Figure 6:
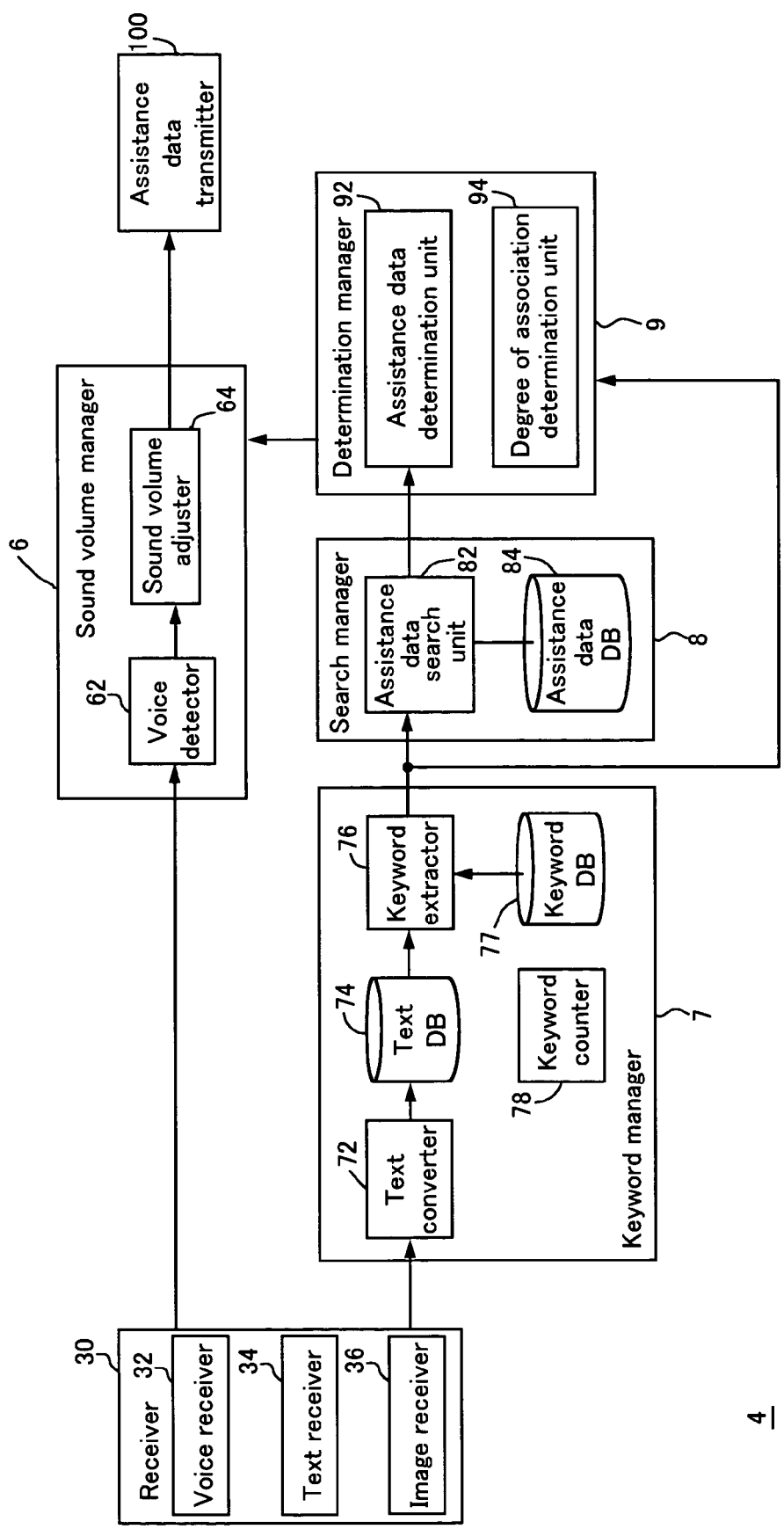
FIG. 6 shows an example of the configuration of a communication assistance device employed in the first embodiment of the present invention.

FIG. 6 is an example of the configuration of a communication assistance device 4. Each communication assistance device 4 includes a receiver 30, a sound volume manager 6, a keyword manager 7, a search manager 8, a determination manager 9, and an assistance data transmitter 100. Each of these components will be described below.

Receiver

The receiver 30 receives communication data transmitted from the user terminals 1. The receiver 30 may receive communication data not only from the user terminals 1, but also communication data from the communication assistance devices 4 or the server terminal 2. The receiver 30 includes, for example, a sound receiver 32 that receives sound data from the microphone 13, a text receiver 34 that receives text data from the keyboard 11, and an image receiver 36 that receives image data from the camera 15.

Note that the receiver 30 can be effectuated by client functions included in the user terminals 1 connected to the video conference system. If this is the case, then the receiver 30 can be omitted.

Keyword Manager

The keyword manager 7 detects keywords in the communication data received by the receiver 30. The keyword manager 7 includes, for example, a text converter 72, a text DB 74, a keyword extractor 76, a keyword DB 77, and a keyword counter 78.

The text converter 72 converts sound data in the communication data received by the receiver 30 to text data by means of, for example, a sound text conversion tool, and converts image data to text data by means of, for example, a tool that extracts text data from image data or a tool that produces text data from image data which exhibits image data characteristics. The text DB 74 stores communication data that was converted to text data by means of the text converter 72. It is preferable that the text DB 74 associate and store the communication data with the user terminals 1 that transmitted that communication data because the degree of association with the assistance data (described below) can thereby be determined.

The keyword DB 77 stores a vocabulary list that is a plurality of keywords. The keyword extractor 76 compares the text DB 74 with the keyword DB 77, and extracts keywords from the text DB 74. The extraction of the keywords is performed by, for example, calculating the number of times a keyword appears in a fixed period of time, counting the keywords by means of the keyword counter 78, and extracting the keywords in descending order according to the frequency with which they occur. In the alternative, the keywords that appear over a fixed number of times may be extracted. In addition, the associated keyword DB described above that stores only keywords which may be associated with the communication data between the user terminals 1 may serve as the keyword DB 77, and thus keywords for searching for more useful assistance data can be efficiently extracted when the keywords are extracted by comparing the associated keyword DB and the text DB 74. In addition to the above, keywords may be detected by activating a search button, and the keywords may then be extracted.

In order to determine the degree of association by means of a degree of association determination unit 94, a keyword extractor 76 of the keyword manager 7 transmits the keywords extracted from the text DB 74 and data on the user terminals 1 that transmitted those keywords to the determination manager 9. Here, the data on the user terminals 1 includes data such as the user names used in the user terminals 1 that transmitted the keywords, user IDs, and the date and time that the user terminals transmitted the keywords.

Search Manager

The search manager 8 searches for and retrieves assistance data based upon the keywords extracted by means of the keyword manager 7. The search manager 8 includes, for example, an assistance data search unit 82 and an assistance data DB 84.

The assistance data DB 84 stores, for example, assistance data that is associated with the keywords in the keyword DB. Furthermore, more useful assistance data can be retrieved if the assistance data is associated with the aforementioned associated keyword DB and stored, and is thus preferred. The assistance data search unit 82 searches the assistance data DB 84 for assistance data that matches the keywords extracted by the keyword manager 7. After searching the assistance data, the assistance data search unit 82 associates the keywords extracted by the keyword manager 7 with the assistance data, and transmits these to the determination manager 9. Instead of searching for assistance data in the assistance data DB 84, a wide range of assistance data can be searched for and retrieved if the search manager 8 searches for assistance data on computer terminals on the network 3, e.g., on WWW servers on the Internet.

Determination Manager

The determination manager 9 determines the form of the assistance data, i.e., the data format, and the degree of association between the assistance data and the user terminals. The determination manager 9 includes, for example, an assistance data determination unit 92 and the degree of association determination unit 94.

The assistance data determination unit 92 determines whether the assistance data to be provided to the user terminals 1 is sound data, text data and/or image data.

The degree of association determination unit 94 receives the keywords that were extracted by the keyword manager 7, data on the user terminals 1 that transmitted those keywords, and assistance data associated with the keywords from the search manager 8, and determines the degree of association between the assistance data and each user terminal 1, or the degree of association between the assistance data and all of the user terminals 1.

For example, the degree of association determination unit 94 determines the degree of association between the assistance data and each user terminal 1 based upon the order in which each user terminal 1 transmitted the keywords that match with the assistance data. The transmission order is determined, for example, based upon the keywords extracted by the keyword extractor 76 and data on the user terminals 1 that transmitted those keywords, or the assistance data that is associated with the keywords that was extracted by the search manager 8. In situations in which the same keywords are transmitted from a plurality of user terminals 1 (hereinafter referred to as "common keywords"), and the assistance data that matches those common keywords is retrieved by the search manager 8, the transmission order of each user terminal 1 that transmitted those common keywords is determined based upon data from the keyword extractor 76 or the search manager 8. For example, it is thought that the degree of association between the assistance data and the user terminals 1 will be highest with the first user terminal 1 that transmitted the common keywords. Thus, if a user terminal 1a was the first to transmit the common keywords, the degree of association determination unit 94 will determine that the user terminal 1a has a higher degree of association with the common keywords than the other user terminals 1b, 1c, etc., i.e., there is a high degree of association with the assistance data.

In addition, the degree of association between each user terminal 1 and the assistance data is determined by the transmission frequency of the keywords transmitted from each user terminal 1. The transmission frequency is determined based upon, for example, the relationship between the keywords extracted from the keyword extractor 76 (in the same way as noted above) and the user terminals 1 that transmitted the common keywords. In a situation in which common keywords were transmitted from a plurality of user terminals 1 and assistance data that matches those common keywords is retrieved by the search manager 8, the transmission frequency of the common keywords will be calculated for each user terminal 1. For example, it is thought that the degree of association between the user terminal 1a and the common keywords will be proportional to the transmission frequency of the keywords from the user terminal 1a. Thus, if the degree of association determination unit 94 determines that the transmission frequency of the common keywords by the user terminal 1a is relatively higher than the other user terminals 1b, 1b, etc., then the degree of association determination unit 94 will determine that the degree of association between the user terminal 1a and the assistance data that matches the common keywords is higher than that of the other user terminals 1b, 1c, etc.

In addition, when the transmission frequency of the keywords by the user terminal 1a is calculated for each keyword (α, β, etc.), the degree of association with the assistance data can be determined. In this situation, because the degree of association between the assistance data and the user terminal 1a is determined based only upon the transmission frequency of the keywords transmitted from the user terminal 1a, and the relationship between the user terminal 1a and the other user terminals 1b, 1c, etc. is not considered, the degree of association between each user terminal and the assistance data can be evaluated.

Moreover, the degree of association determination unit 94 may determine the degree of association between the assistance data and all of the user terminals based upon the total transmission frequency of the keywords by all of the user terminals 1. It is thought that the degree of association will grow higher as the total transmission frequency of the keywords transmitted from the plurality of user terminals 1 increases. Thus, by calculating the transmission frequency, the frequency with which a topic is being discussed between the user terminals 1 can be determined.

In addition, the number of times that the same assistance data has been retrieved by the degree of association determination unit 94 may be calculated, and if the calculated number of times is high, it may be determined that the assistance data has been repeatedly retrieved and transmitted.

Thus, by calculating the transmission order or the transmission frequency, it can be determined whether or not the sound volume of the assistance data has been adjusted and whether or not the assistance data has been transmitted in accordance with the transmission order or the transmission frequency.

Furthermore, the degree of association determination unit 94 may be modified so that it notifies one of changes to the contents of the assistance data.

Sound Volume Manager

The sound volume manager 6 detects whether voice communication is being carried out in the video conference system, and adjusts the sound volume of the assistance data that includes sound data. The sound volume manager 6 includes, for example, a voice detector 62 and a sound volume adjustor 64.

The voice detector 62 detects the communication status, such as whether or not voice data is included in the communication data received by the receiver 30 or the client functions of the video conference system. Other than the reception of communication data from the user terminals 1, if communication data is received from the server terminal 2 or the communication assistance devices 4 connected via the network 3, the sound volume of assistance data that includes voice data can be adjusted in accordance with the communication status between the terminals connected via the network.

Preferably, the voice detector 62 can distinguish between voice data and background noise in order to detect the presence of voice data. In addition, it is preferable that the voice detector 62 be capable of measuring sound volume so that the sound volume of assistance data that includes voice data can be adjusted based upon the use of the measured sound volume as a reference. Furthermore, the voice detector 62 may also be made capable of detecting the gender of the speaker.

The sound volume adjustor 64 adjusts the sound volume of the assistance data to be provided in situations in which voice data is detected by the voice detector 62 and it is determined by the assistance data determination unit 92 that voice data is included in the assistance data. Thus, interruptions to the voice communication between the user terminals 1 by the assistance data can be reduced.

On the other hand, if voice data is not included in the assistance data, i.e., it is determined that the assistance data is comprised of text data or image data, the assistance data will be provided to the user terminals 1 as is and the process of providing the assistance data will be switched.

In situations in which the sound volume is to be adjusted, if for example it is determined by the voice detector 62 that there is no voice data, the sound volume of the assistance data will be set to a normal sound volume or a sound volume that has no relationship to the normal sound volume. On the other hand, if it is determined that voice data from the user terminals 1 is present, the sound volume of the assistance data is set such that it is lower than the normal sound volume, or set to a sound volume that is lower than the sound volume measured by the voice detector 62.

In addition, if the assistance data includes voice data, the sound volume adjustor 64 may be set so as to adjust the sound volume of the assistance data in accordance with the results of determination made by the degree of association determination unit 94.

When the degree of association is determined by the degree of association determination unit 94 based upon the transmission order of the keywords, the assistance data will be provided to the user terminal 1a that was the first to transmit, for example, certain common keywords, and at a sound volume that is higher than that of the other user terminals 1b, 1c, etc. In addition, when the degree of association is determined by the degree of association determination unit 94 based upon the transmission frequency of the common keywords from each user terminal 1, the sound volume of the assistance data will be adjusted in proportion to the transmission frequency and then provided to the user terminals 1. Furthermore, the assistance data will be provided to a particular user terminal 1 (for example, user terminal 1a) at a sound volume that is proportional to the calculated transmission frequency of each keyword from the user terminal 1a.

Thus, by adjusting the sound volume of assistance data that includes voice data in accordance with the degree of association between the assistance data and common keywords from each user terminal 1, the assistance data can be provided in accordance with the degree to which each user needs it. In addition, by determining the degree of association by means of the transmission order or the transmission frequency of the keywords, the degree of association can be automatically determined and the sound volume can be adjusted. Furthermore, by adjusting the sound volume in this way, interruptions to voice communications between user terminals due to the assistance data can be reduced.

In addition, when it is determined by the degree of association determination unit 94 that a topic is frequently discussed between all of the user terminals 1, the sound volume of the assistance data will be increased and provided to all of the user terminals. By adjusting the sound volume in this way, the sound volume can be automatically adjusted in accordance with the frequency with which a topic is discussed between user terminals.

Furthermore, if it is determined by the degree of association determination unit 94 that the same assistance data is frequently retrieved, by reducing the sound volume of that assistance data and increasing the sound volume of assistance data that is infrequently retrieved, the sound volume of the assistance data that is repeatedly transmitted can be reduced. The association determination unit 94 can also determine that it is unnecessary to output frequently retrieved assistance data to the user terminals 1.

In addition, if the degree of assistance determination unit 94 determines that the contents of assistance data has changed, the sound volume of the assistance data can be increased by the sound volume adjustor 64 and provided to the user terminals 1. For example, if the price of a stock is provided as the assistance data, the sound volume of the stock price data can be increased and provided to the user terminals 1 when there has been a large movement in the price of the stock.

In addition, the sound volume adjustor 64 may be set so as to provide assistance data that includes voice data in a voice that is the same gender as or a different gender than the gender detected by voice detector 62.

Assistance Data Transmitter The assistance data transmitter 100 provides assistance data from the sound volume manager 6 to the user terminals 1. If voice data is detected by the voice detector 62, and it is determined by the assistance data determination unit 92 that voice data is included in the assistance data, the sound volume adjustor 64 will adjust the sound volume as described above and provide the assistance data to the user terminals 1. Here, it is preferable that assistance data that includes voice data be converted to text data or image data, and assistance data that does not include voice data be provided to the user terminals 1. If voice data is converted to text data or image data, a discussion can proceed smoothly because the assistance data can be provided to the user terminals 1 without adjusting the sound volume even if the assistance data includes voice data, and because there will be no interruptions to the voice communication between the user terminals 1 due to the assistance data.

On the other hand, if voice data was not detected by the voice detector 62, assistance data that includes voice data, text data, and/or image data will be provided to the user terminals 1.

(2) Flow of the Communication Assistance Process Performed by the Communication Assistance Device Next, the flow of the communication assistance process when the communication assistance devices 4 connected to the video conference system provide assistance data to the user terminals 1 will be described. First, the process flow that extracts keywords for retrieving assistance data will be described.

(2-1) Keyword Extraction Process Flow

Figure 7:
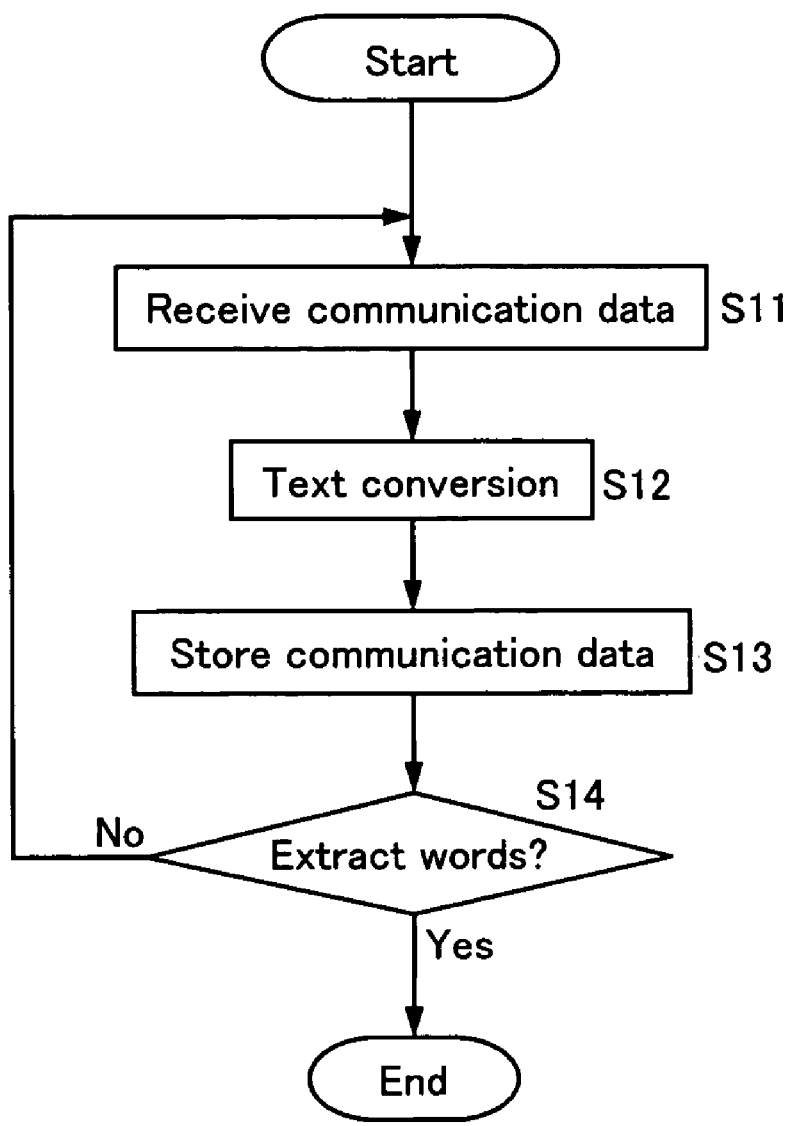
FIG. 7 is flowchart that shows an example of the flow of a keyword extraction process in the first embodiment of the present invention.

FIG. 7 is a flowchart showing an example of the flow of the keyword extraction process. The communication assistance devices 4 are each comprised of a keyword DB 77 in which a vocabulary list that is a collection of keywords is pre-stored.

Step S11: Communication data transmitted from the user terminals 1 is received by the receiver 30. Voice data, text data, and/or image data are respectively received by the voice receiver 32, the text receiver 34 and/or the image receiver 36.

Step S12: The communication data from the user terminals 1 that is received by the receiver 30 is converted to text data by the text converter 72.

Step S13: The communication data converted into text data by the text converter 72 is accumulated in the text DB 74, and the communication data carried out between the user terminals 1 is stored thereby.

Step S14: The text DB 74 is compared with the keyword DB 77, and the keywords are extracted from the text DB 74. The number of keywords may be calculated by the keyword counter 78, and the keywords may be extracted based upon that number.

(2-2) Flow of the Communication Assistance Process

Figure 8:
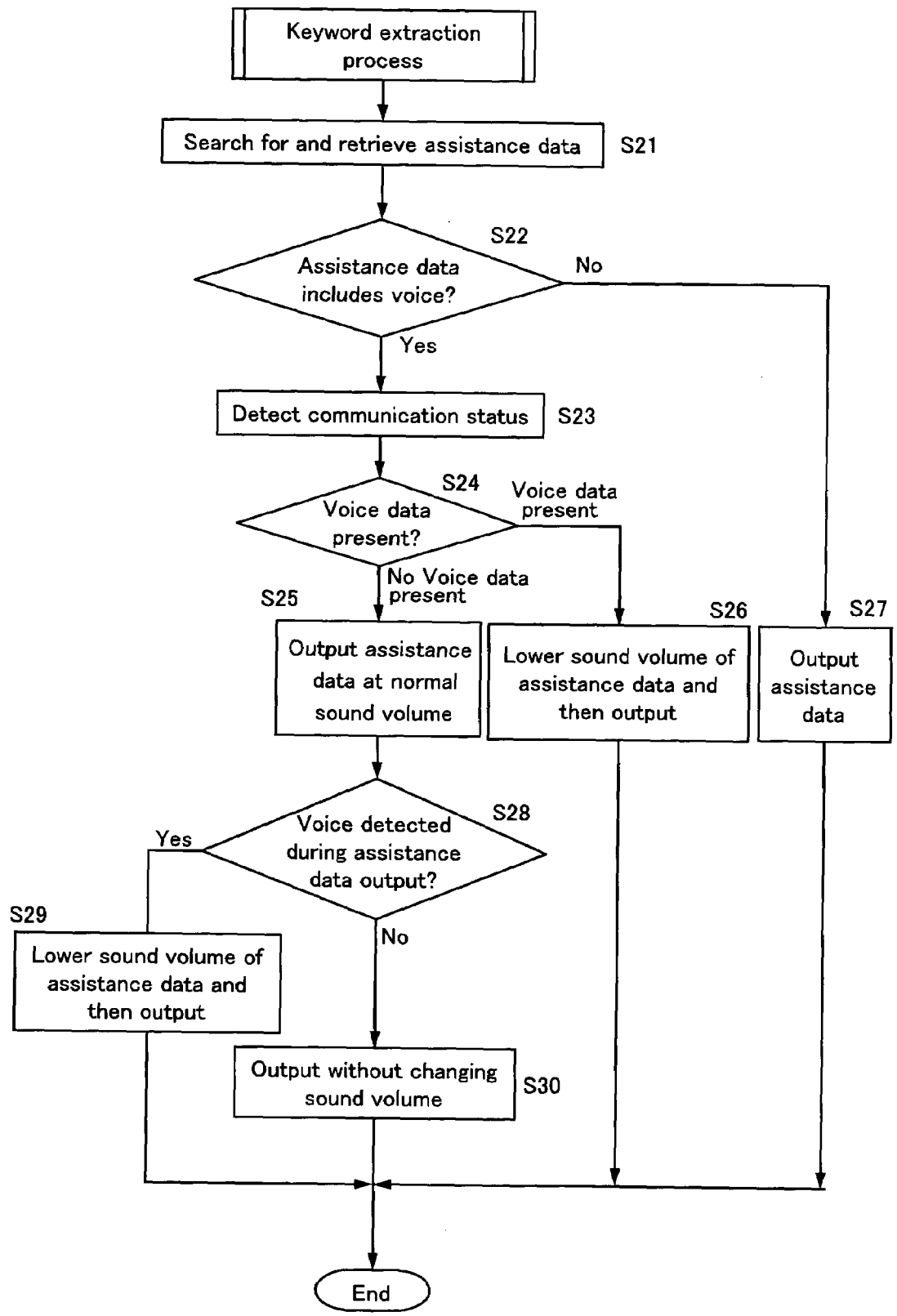
FIG. 8 is a flowchart showing an example of the flow of the communication assistance process in the first embodiment of the present invention.

Next, FIG. 8 will be used to describe the flow of the communication assistance process in the video conference system. FIG. 8 is a flowchart showing an example of the flow of the communication assistance process in the video conference system. This process is executed after the keywords are extracted by the keyword extraction process noted above.

Step S21: Assistance data is retrieved by the assistance data search unit 82 based upon the keywords extracted by the keyword extraction process noted above.

Step S22: The assistance data determination unit 92 determines whether or not the assistance data includes voice data.

Step S23: If it is determined by the assistance data determination unit 92 that the assistance data includes voice data, the voice detector 62 detects the communication status between the user terminals 1. Here, the detection of the communication status takes place when assistance data is to be provided, but it is preferable that the voice detector 62 be set to always detect the communication status while the video conference system is being used, thus allowing the sound volume of the assistance data to be adjusted at any time in response to the communication status between the user terminals 1.

Step S24: The presence of voice data is determined based upon the communication status detected by the voice detector 62.

Step S25: If the communication data between the user terminals 1 did not include voice data in Step S24, the assistance data that includes voice data will be output to the user terminals 1 at a normal sound volume or at a sound volume that has no relationship to the normal sound volume.

Step S26: If the communication data from the user terminals 1 included voice data in Step S24, the assistance data that includes voice data will be output to the user terminals 1 at a sound volume that is lower than the normal sound volume, or a sound volume that is lower than the sound volume measured by the voice detector 62. In addition, the sound volume for each user terminal 1a, 1b, 1c, etc., or the sound volume for all of the user terminals 1, may be adjusted based upon the degree of association determined by the degree of association determination unit 94. Furthermore, the assistance data that includes voice data may be converted to text data or image data by the assistance data transmitter 100 and provided to the user terminals 1.

Step S27: If it is determined in Step S22 that the assistance data does not include voice data, the assistance data is comprised of text data or image data and will be output as is to the user terminals 1.

Step S28: While the assistance data is output at a normal sound volume or a sound volume that has no relationship to the normal sound volume in Step S25, it will be determined whether or not voice communication has begun between the user terminals 1.

Step S29: If it is determined in Step S28 that voice communication between the user terminals 1 has begun while the assistance data is still being output, the sound volume of the assistance data will be adjusted or the assistance data will be converted to text or image data as described in Step S26, and then output to the user terminals 1.

Step S30: If voice communication was not detected between the user terminals 1 in Step S28, the assistance data will be output to the user terminals 1 without changing the sound volume.

(3) Example of the Process Performed Between the User Terminals and the Communication Assistance Devices An example of the process that will be carried out between the user terminals 1 and a communication assistance device 4 when the user terminals 1 are connected to the communication assistance device 4 via the network 3 will be described below.

As shown in FIG. 4, a video conference system includes, for example, 5 user terminals 1 connected together and between which communication is being carried out.

Figure 9:
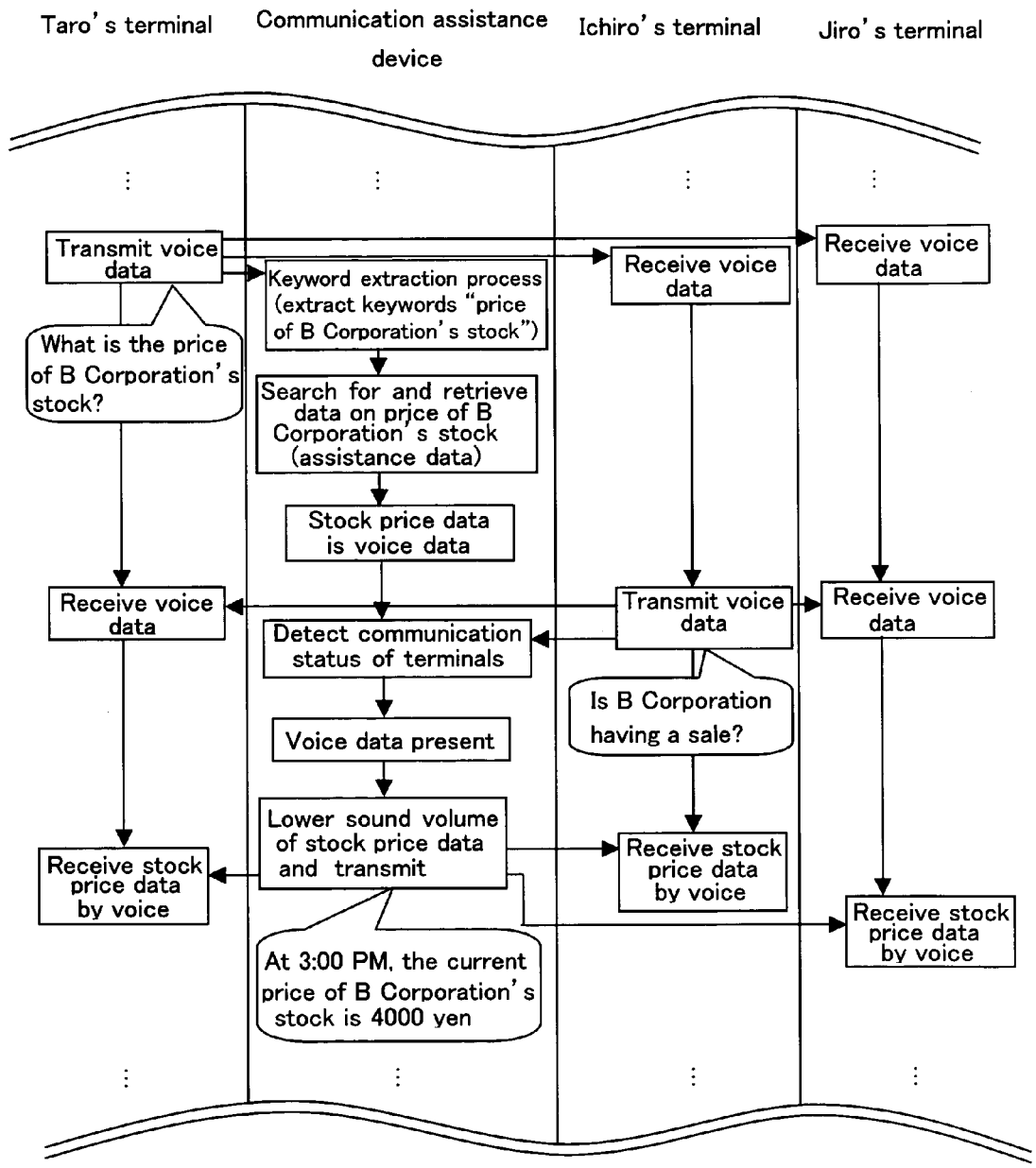
FIG. 9 is a chart showing the status of a discussion in a video conference system over a period of time while employing the communication assistance process in the first embodiment of the present invention.
Figure 10:
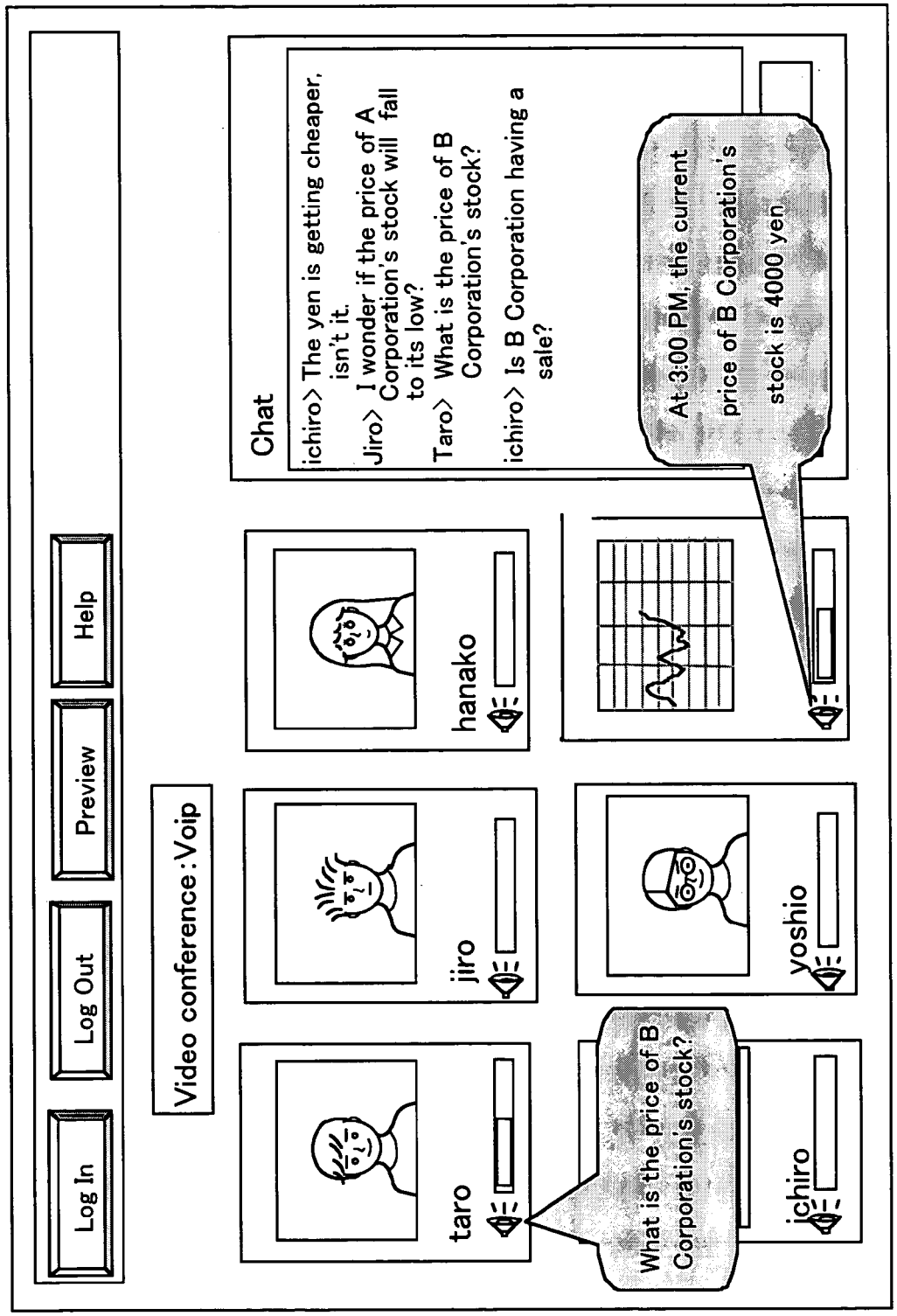
FIG. 10 shows an example of a display screen of a user terminal that is carrying out the discussion shown in FIG. 9.

FIG. 9 is a chart showing the communication status over a period of time between three of the five user terminals 1 shown in FIG. 4 and one of the communication assistance devices 4. FIG. 10 is an example of a user terminal display screen that is engaged in the communication shown in FIG. 9. Referring now to FIGS. 9 and 10, the process will be described with respect to a situation in which communication regarding the price of B Corporation's stock is being carried out between the user terminals, and the assistance data provided from the communication assistance device 4 to the user terminals 1 includes voice data.

When voice data that includes the question "What is the price of B Corporation's stock?" is transmitted from Taro's terminal, Ichiro's and Jiro's terminals will receive the voice data from Taro's terminal. The communication assistance device 4 extracts the keywords "the price of B Corporation's stock" from the voice communication between the user terminals 1, and will retrieve data on the price of B Corporations stock (assistance data) based upon these keywords. In addition, the communication assistance device 4 will determine whether or not the stock price data is voice data, and will recognize that this stock price data is voice data as a result of this determination.

At this point, Ichiro transmits voice data that includes the question "Is B Corporation having a sale?", and Taro's and Jiro's terminals receive this voice data from Ichiro's terminal. Then the communication assistance device 4 detects the voice data communication status between the user terminals 1 at the point at which it will transmit the stock price data to the user terminals 1, and will detect that voice data communication is being carried out between the user terminals 1. Accordingly, the communication assistance device 4 will lower the sound volume of the stock price data and transmit that data to the user terminals 1. Here, stock price data that includes the statement "At 3:00 PM, the current price of B Corporation stock is 4000 yen" is transmitted from the communication assistance device 4, and this stock price data is received by Taro's, Ichiro's and Jiro's terminals.

Figure 11:
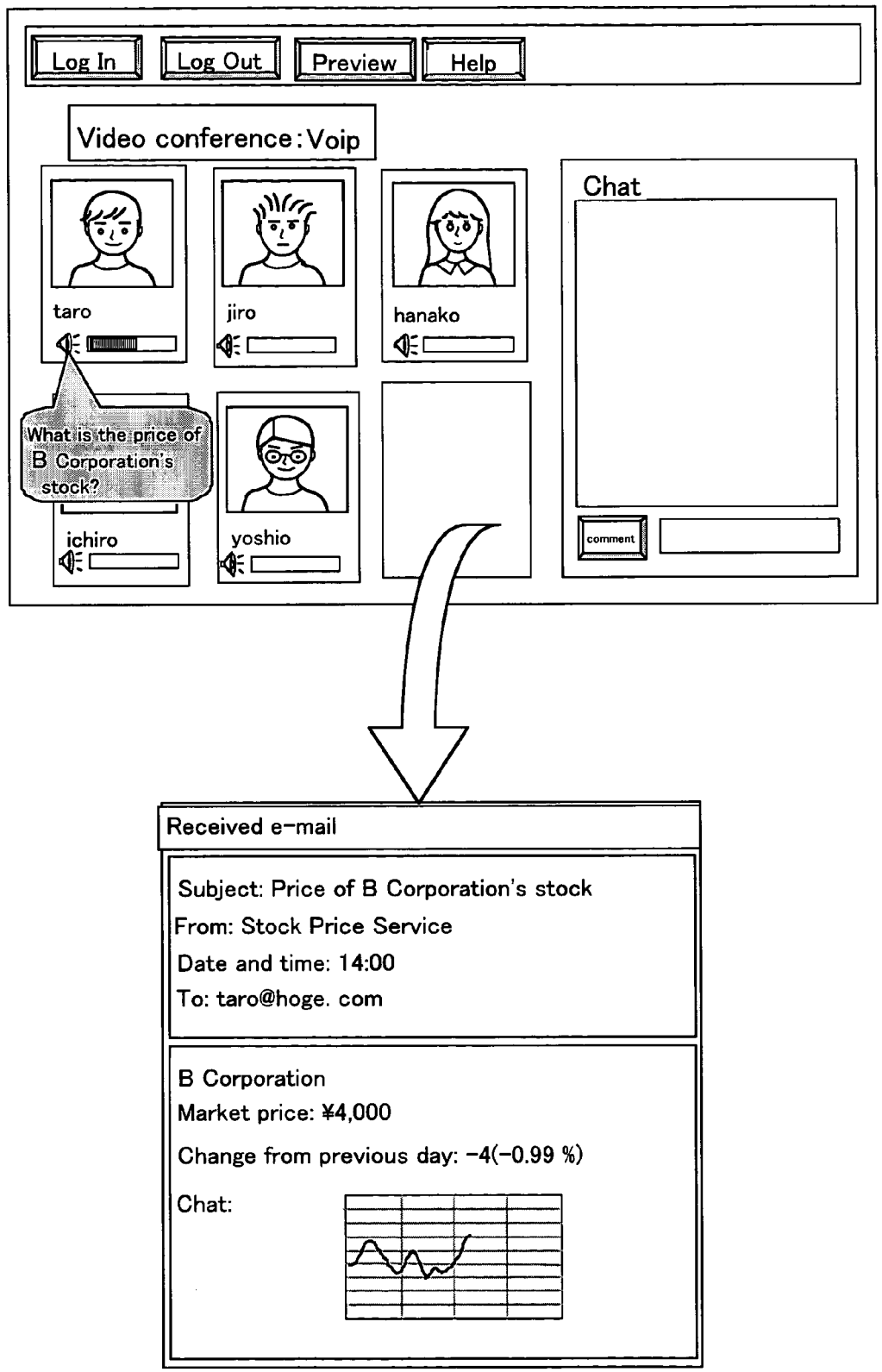
FIG. 11 shows an example of a display screen of a user terminal in a situation in which assistance data is converted from voice data to text data or image data and transmitted to the user terminal via e-mail.

FIG. 11 shows an example of the display screen of a user terminal 1 in a situation in which the assistance data is converted to text data or image data in Step S26 and then transmitted to the user terminals 1 via e-mail. In FIG. 10, the user terminals 1 receive the stock price data at a relatively low sound volume, however the user terminals 1 receive the stock price data by text e-mail in FIG. 11.

As shown above, when assistance data provided from the communication assistance device 4 includes voice data, and voice communication is being carried out between the user terminals 1, the sound volume of the assistance data is adjusted and then provided to the user terminals 1. Thus, even in situations in which voice communication is being carried out between the user terminals 1, interruptions to the voice communication between the user terminals 1 due to the assistance data can be reduced while simultaneously providing assistance data to a plurality of user terminals. Because of that, a discussion can proceed smoothly between user terminals 1, and the quality of the discussion therebetween can be increased while effectively sharing assistance data.

On the other hand, in situations in which voice data is not included in the assistance data, the assistance data can be provided as is to the user terminals 1, and the process of providing assistance data to the user terminals 1 can be switched in response to the data format of the assistance data.

Second Embodiment (1) Configuration

FIGS. 5 and 6 will be employed again to describe the configuration of the server terminal 2 and each communication assistance device 4 of the video conference system according to a second embodiment of the present invention.

In this embodiment, the assistance data determination unit 92 of the communication assistance device 4 will determine whether or not an advertisement is included in the assistance data. The remaining configurations of the communication assistance devices 4 and the server terminal 2 are identical to that described above in the first embodiment.

Figure 12:
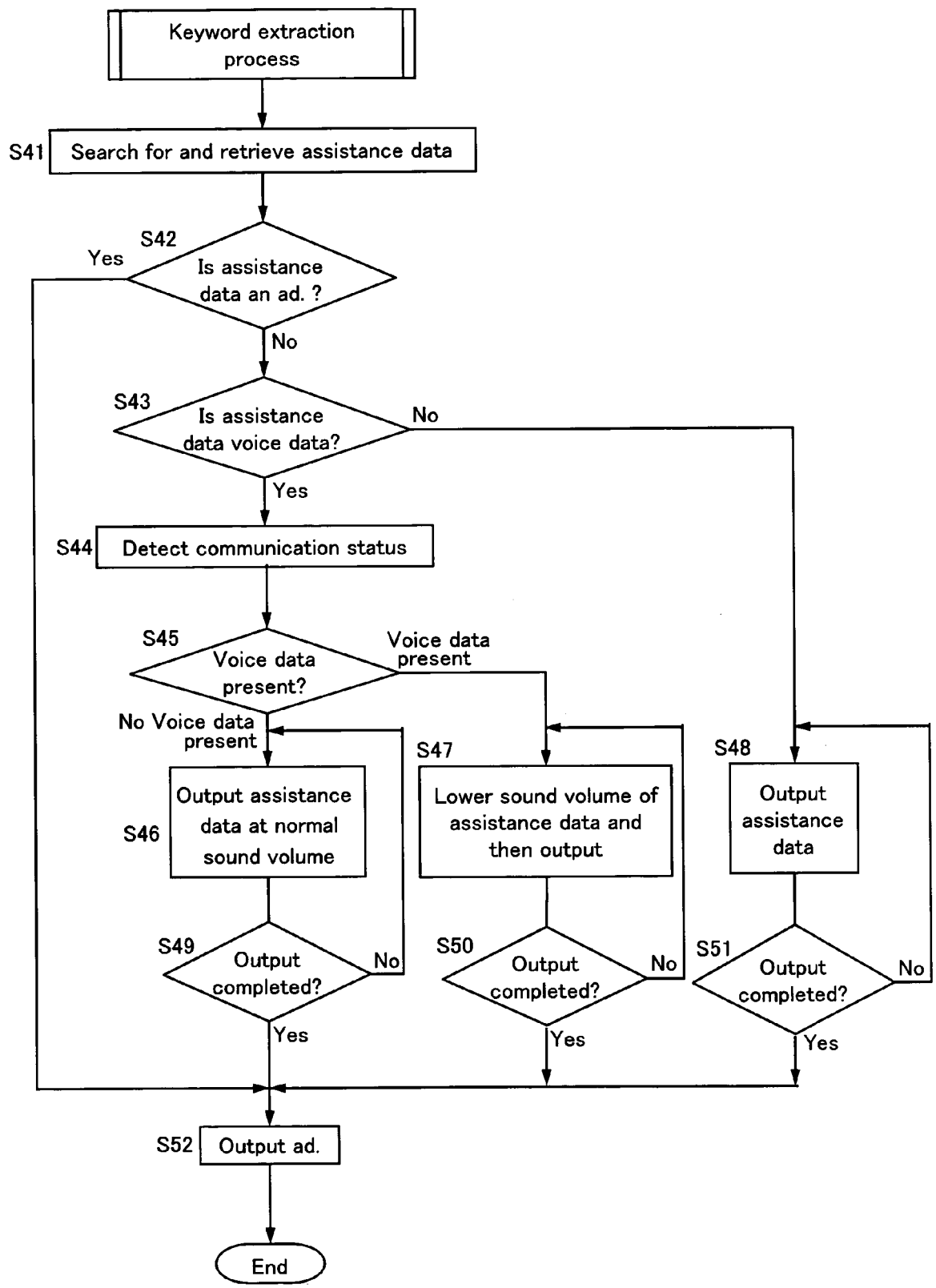
FIG. 12 is a flowchart showing an example of the flow of the communication assistance process according to a second embodiment of the present invention, in which an advertisement is to be provided to the user terminals.

(2) Flow of the Communication Assistance Process in Situations in which the Assistance Data to be Provided Includes an Advertisement Next, FIG. 12 will be used to describe the flow of the communication assistance process in situations in which the assistance data to be provided by the communication assistance device 4 includes an advertisement. FIG. 12 is a flowchart showing an example of the flow of the communication assistance process in the video conference system. This process is executed after the keywords are extracted by the keyword extraction process noted above.

Step S41: Assistance data is retrieved by the assistance data search unit 82 based upon the keywords extracted by the keyword extraction process noted above.

Step S42: The assistance data determination unit 92 determines whether or not the assistance data retrieved in Step S41 is an advertisement. In situations in which the assistance data includes an advertisement, the assistance data and the advertisement may be separated from each other.

Step S43: If it is determined in Step S42 that the assistance data is not an advertisement, the assistance data determination unit 92 determines whether or not the assistance data includes voice data.

Step S44: If it is determined by the assistance data determination unit 92 that the assistance data includes voice data, the voice detector 62 detects the voice data communication status between the user terminals 1.

Step S45: The voice detector 62 detects the presence or absence of voice data between the user terminals 1.

Step S46: If voice data between the user terminals 1 was not detected in Step S45, the assistance data that includes voice data will be output to the user terminals 1 at a normal sound volume or at a sound volume that has no relationship to the normal sound volume.

Step S47: If voice data from the user terminals 1 was detected in Step S45, the assistance data that includes voice data will be output to the user terminals 1 at a sound volume that is lower than the normal sound volume, or a sound volume that is lower than the sound volume measured by the voice detector 62. In addition, the sound volume may be adjusted based upon the degree of association determined by the degree of association determination unit 94, and assistance data that includes voice data may be converted to text or image data and output.

Step S48: If it is determined in Step S43 that the assistance data does not include voice data, the assistance data is comprised of text data or image data and will be output as is to the user terminals 1.

Step S49: It will be determined whether or not the output of the assistance data in Step S46 has been completed.

Step S50: It will be determined whether or not the output of the assistance data in Step S47 has been completed.

Step S51: It will be determined whether or not the output of the assistance data in Step S48 has been completed.

Step S52: If it is determined in Step S42 that the assistance data is an advertisement, and determined that the output of the assistance data in Steps S50 and S51 is completed, the advertisement that is included in the assistance data will be output to the user terminals 1.

Figure 13:
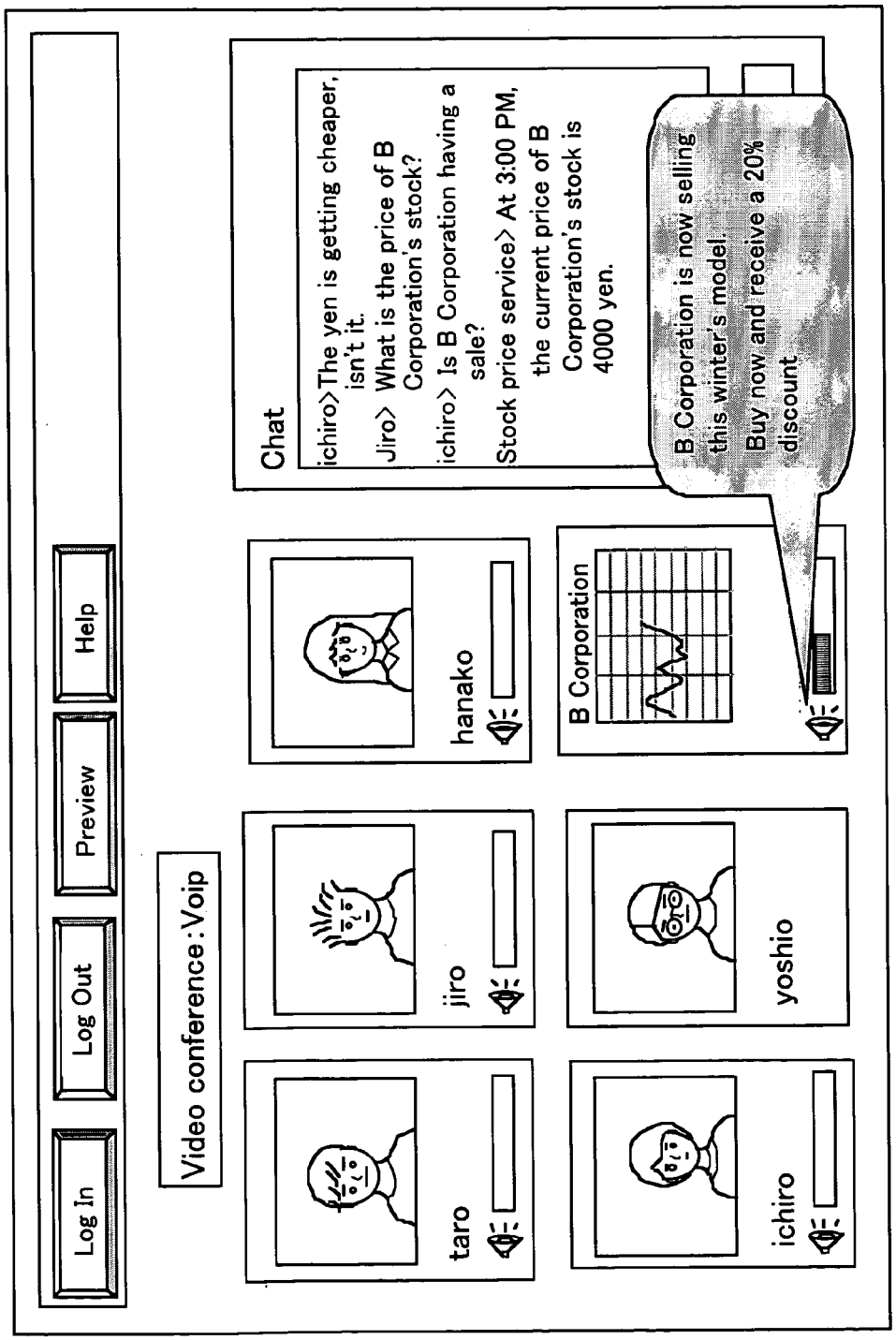
FIG. 13 is an example of a display screen of a user terminal when an advertisement is provided thereto according to the second embodiment of the present invention.

FIG. 13 shows an example of the display screen of a user terminal 1 when an advertisement is provided thereto. If there is no voice communication between the user terminals 1 and no assistance data being provided thereto (the sound volume of each user terminal is "0"), an advertisement will be provided to the user terminals 1.

According to the flowchart shown in FIG. 12, if the assistance data provided from the communication assistance device 4 is an advertisement, or if the assistance data includes an advertisement, the advertisement can be provided to the user terminals 1 in response to whether or not the provision of the assistance data to the user terminals 1 has been completed. In other words, after assistance data has been provided, data that the users may need can be provided by providing an advertisement thereto. In addition, in situations in which assistance data has been provided to the user terminals 1 and an advertisement that includes voice data is to be provided thereto, the advertisement will be provided based upon whether voice communications are being carried out between the user terminals 1. This allows interruptions to voice communication between the user terminals 1 due to advertisements that include voice data to be reduced. Furthermore, unused resources on the network 3 can be effectively utilized by providing advertisements to the user terminals 1.

Third Embodiment

Figure 14:
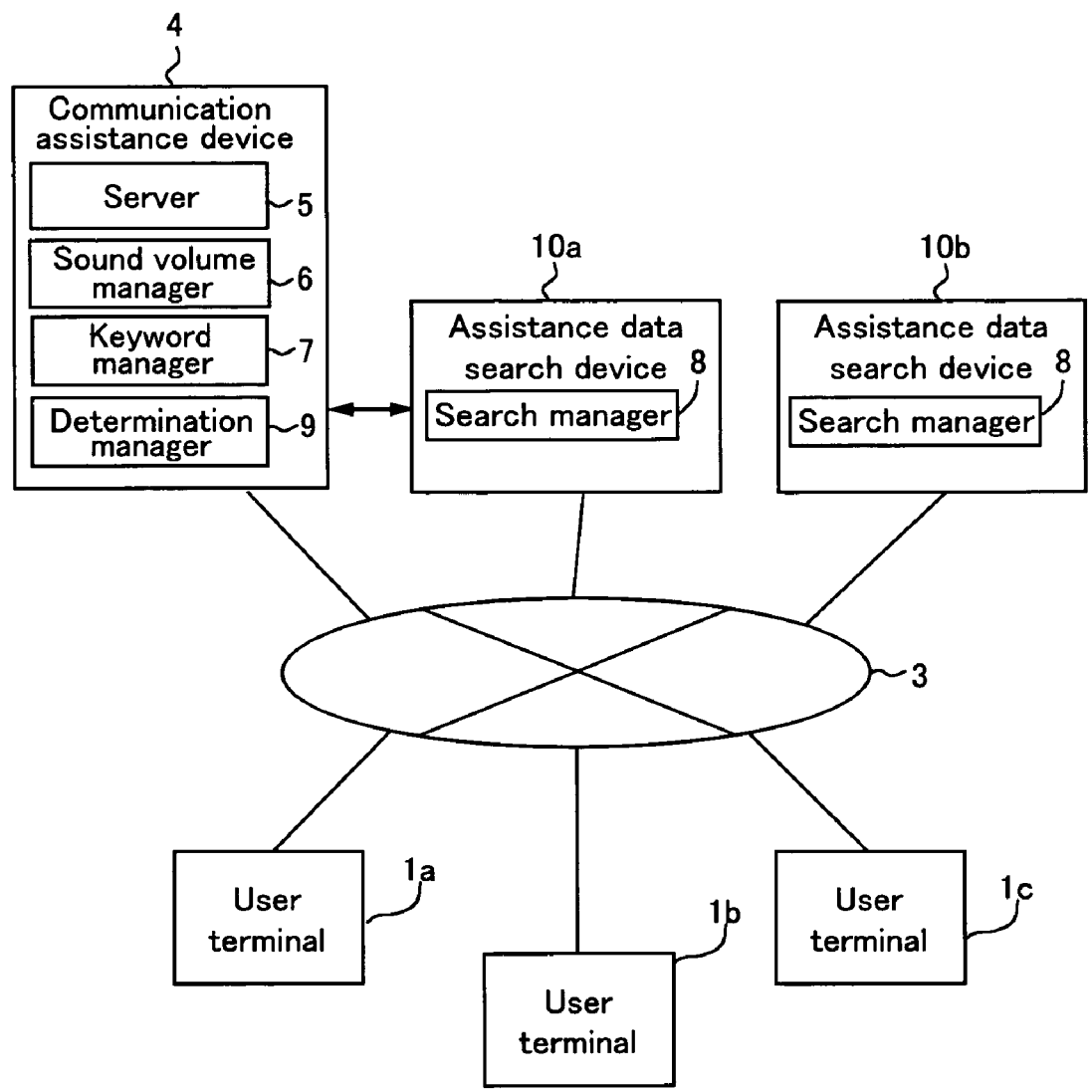
FIG. 14 shows the configuration of a video conference system according to a third embodiment of the present invention.
Figure 15:
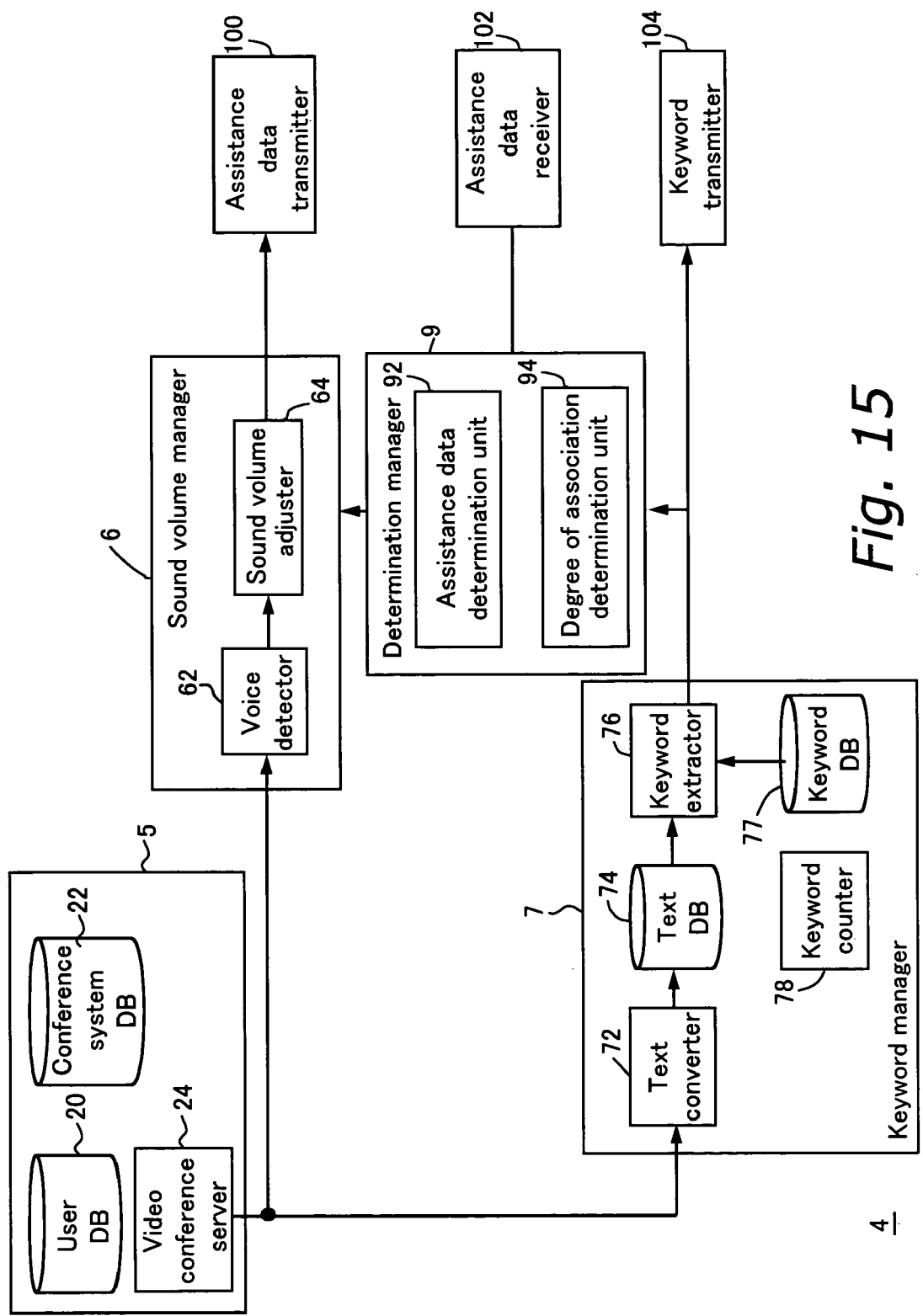
FIG. 15 shows an example of the configuration of a communication assistance device according to the third embodiment of the present invention.
Figure 16:
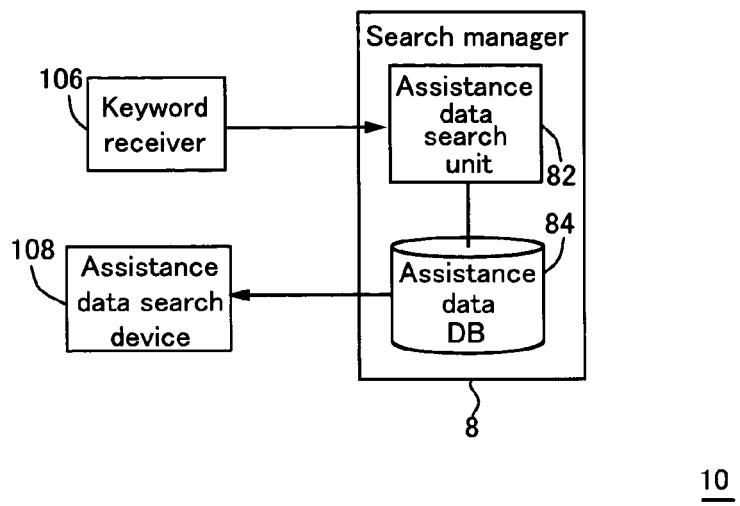
FIG. 16 shows an example of the configuration of an assistance data search device according to the third embodiment of the present invention.

FIGS. 14 to 16 will be employed to describe the configuration of a video conference system according to a third embodiment of the present invention. FIG. 14 shows the configuration of the video conference system according to the third embodiment, FIG. 15 shows an example of the configuration of the communication assistance device 4 in this embodiment, and FIG. 16 shows an example of the configuration of a assistance data search device 10.

(1) Configuration

First, the configuration of the video conference system according to the third embodiment will be described.

(1-1) Overall Configuration

The video conference system according to the third embodiment includes a plurality of user terminals 1, a communication assistance device 4, and one or more assistance data search devices 10 (10*a*, 10*b*, etc.) connected together via a network 3. The communication assistance device 4 includes a server 5, a sound volume manager 6, a keyword manager 7, and a determination manager 9. In addition, each assistance data search device 10 includes a search manager 8.

The specific configuration of the communication assistance device 4 and each assistance data search device 10 will be described below.

(1-2) Configuration of the Communication Assistance Device

The communication assistance device 4 includes the server 5, the sound volume manager 6, the keyword manager 7, the determination manager 9, an assistance data transmitter 100, an assistance data receiver 102, and a keyword transmitter 104.

A text converter 72 in the keyword manager 7 and a voice detector 62 in the sound volume manager 6 receive communication data from a video conference server 24 in the server 5. Here, the video conference server 24 receives communication data such as voice data, text data, and/or image data from terminals such as the user terminals 1 and the assistance data search devices 10 connected to the network 3.

The keyword transmitter 104 transmits keywords extracted by the keyword manager 7 to the assistance data search devices 10. The assistance data receiver 102 receives assistance data transmitted from the assistance data search devices 10. The determination manager 9 receives keywords extracted from the keyword manager 7 together with data on the user terminals 1 that transmitted those keywords, and also receives assistance data by means of the assistance data receiver 102.

Except for the aforementioned configuration, the configurations of the sound volume manager 6, the keyword manager 7, the determination manager 9, and the assistance data transmitter 100 in this embodiment are the same as the configurations of the sound volume manager 6, the keyword manager 7, the determination manager 9, and the assistance data transmitter 100 in the first embodiment.

(1-3) Configuration of the Assistance Data Search Devices

Each assistance data search device 10 includes the search manager 8, a keyword receiver 106, and an assistance data transmitter 108.

The keyword receiver 106 receives keywords extracted from the keyword transmitter 104 in the communication assistance device 4, and transmits the keywords to an assistance data search unit 82 in the search manager 8. The assistance data search unit 82 retrieves assistance data based upon the received keywords, associates the assistance data with the keywords, and transmits this to the assistance data transmitter 108. The assistance data transmitter 108 transmits the assistance data associated with the keywords to the assistance data receiver 102 in the communication assistance device 4.

Except for the aforementioned configuration, the configuration of the search manager 8 in this embodiment is the same as the configuration of the search manager 8 in the first embodiment.

(2) Summary of the Communication Assistance Process in the Third Embodiment

First, a summary of the process used in the video conference system according to the third embodiment will be described.

The video conference server 24 in the communication assistance device 4 receives communication data from the user terminals 1, and the keyword manager 7 extracts keywords from the communication data between the user terminals 1. The keyword manager 7 transmits the extracted keywords to the keyword transmitter 104, and transmits the extracted keywords and data on the user terminals 1 that transmitted those keywords to the determination manager 9. Next, the keyword transmitter 104 transmits the extracted keywords to the assistance data search devices 10 connected to the communication assistance device 10 via the network 3.

The keyword receiver 106 in each assistance data search device 10 receives the keywords transmitted from the keyword transmitter 104, and transmits the keywords to the assistance data search unit 82 in the search manager 8. The assistance data search unit 82 that received the keywords retrieves assistance data that corresponds to the keywords extracted from the assistance data DB 84, associates the assistance data retrieved with the keywords, and transmits this to the assistance data transmitter 108. The assistance data transmitter 108 transmits the received assistance data to the assistance data receiver 102 in the communication assistance device 4.

The assistance data transmitter 102 in the communication assistance device 4 transmits the assistance data associated with the keywords to the determination manager 9. The determination manager 9 determines the format of the assistance data and the degree of association thereof, and transmits this to the sound volume manager 6. The sound volume manager 6 adjusts the sound volume of the assistance data in response to the determination manager 9 and the sound detector 62, and the assistance data transmitter 100 transmits the assistance data to the user terminals 1.

Thus, by having the communication assistance device 4 perform tasks such as extracting keywords and adjusting the sound volume, and having the search manager 8 retrieve assistance data, the processes noted above can be allocated such that parallel processing can occur.

Fourth Embodiment

Figure 17:
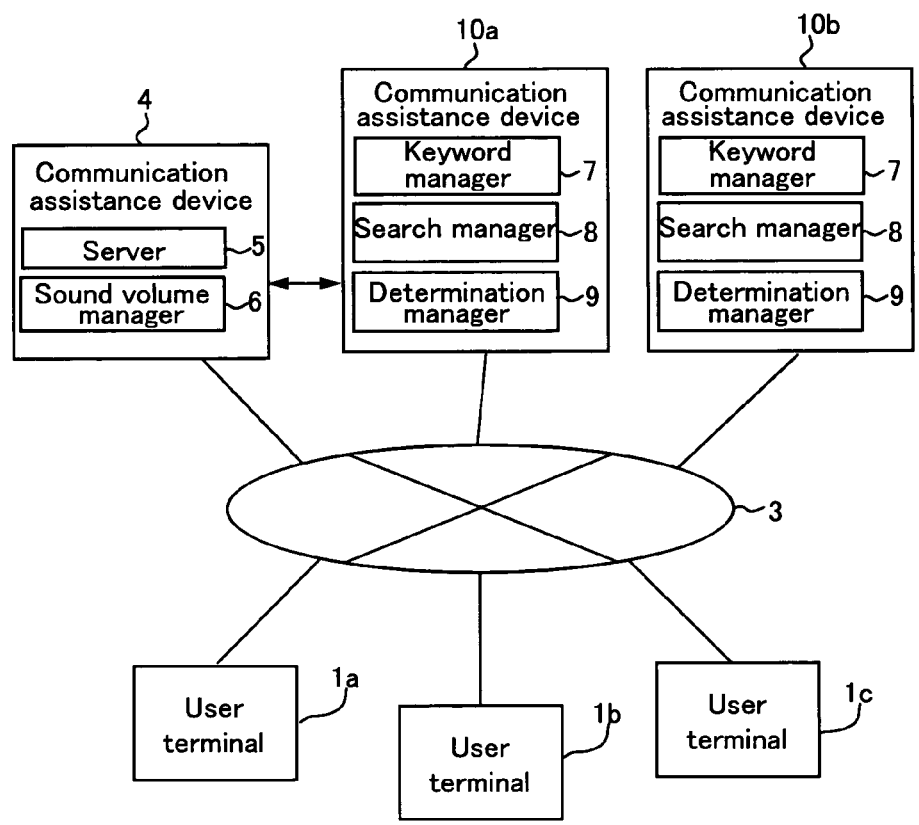
FIG. 17 shows the configuration of a video conference system according to a fourth embodiment of the present invention.
Figure 18:
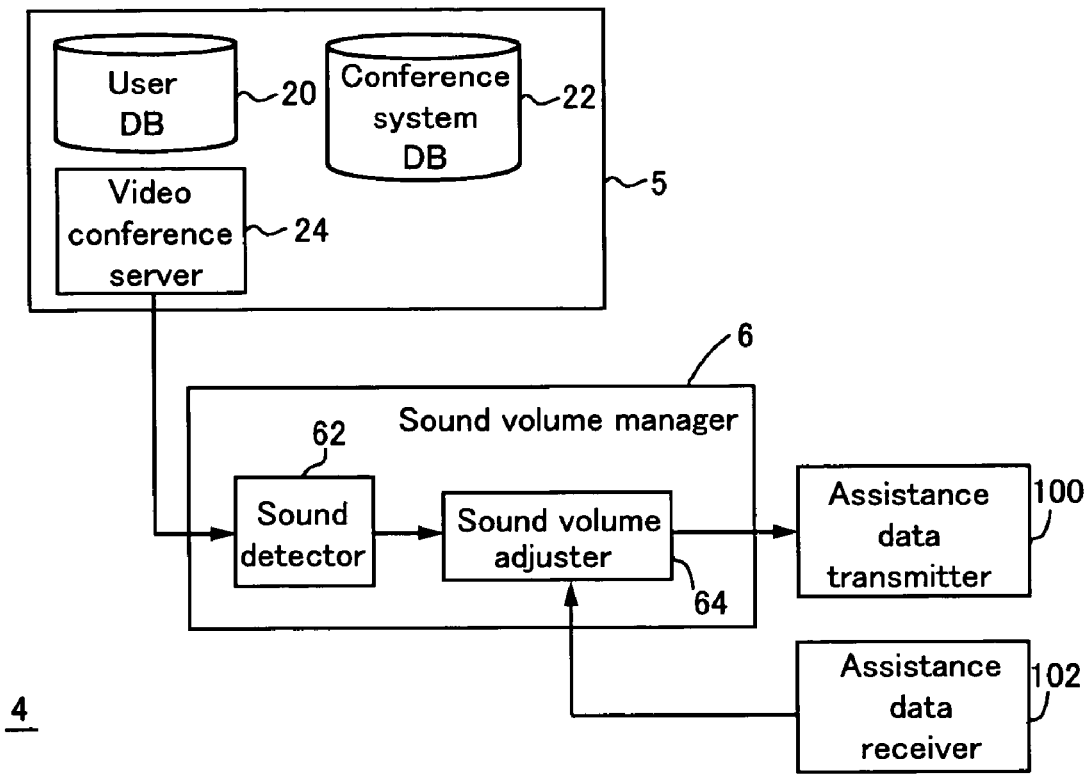
FIG. 18 shows an example of the configuration of a communication assistance device according to the fourth embodiment of the present invention.
Figure 19:
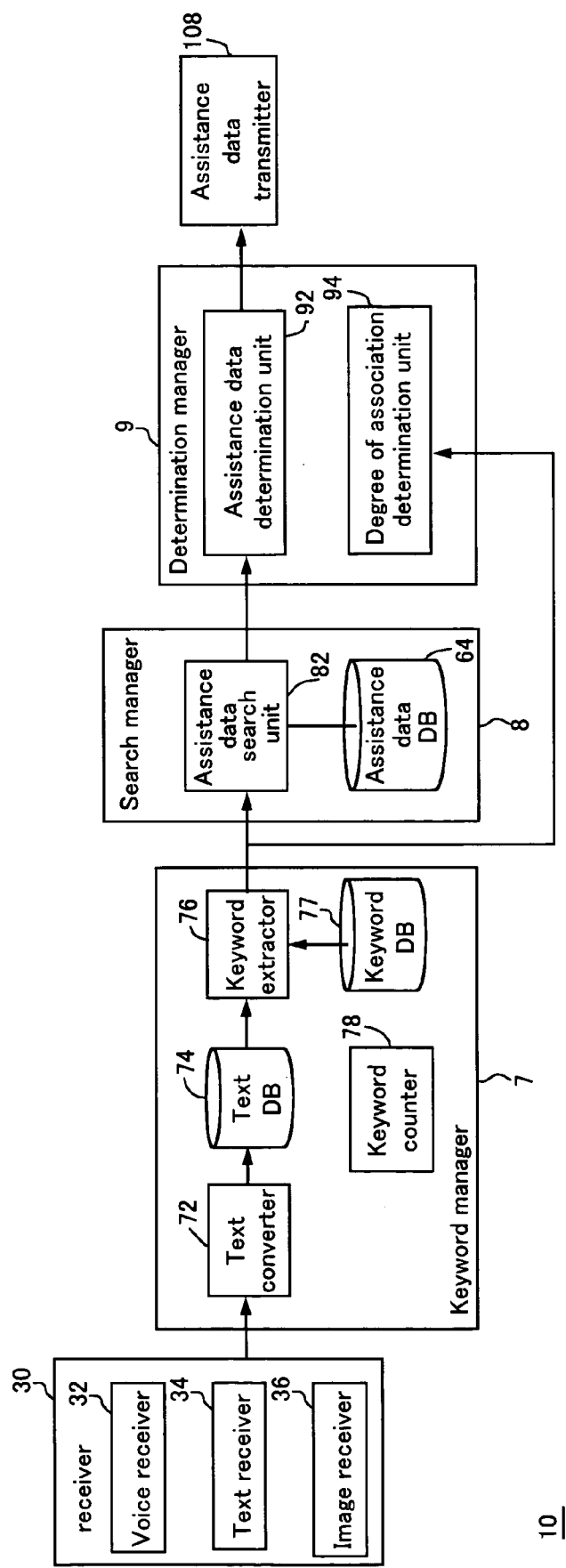
FIG. 19 shows an example of the configuration of an assistance data search device according to the fourth embodiment of the present invention.

FIGS. 17 to 19 will be employed to describe the configuration of a video conference system according to a fourth embodiment of the present invention. FIG. 17 shows the configuration of the video conference system according to the fourth embodiment, FIG. 18 shows an example of the configuration of the communication assistance device 4 in this embodiment, and FIG. 19 shows an example of the configuration of a assistance data search device 10.

(1) Configuration

First, the configuration of the video conference system according to the fourth embodiment will be described.

(1-1) Overall Configuration

The video conference system according to the fourth embodiment includes a plurality of user terminals 1, a communication assistance device 4, and one or more assistance data search devices 10 connected together via a network 3. The communication assistance device 4 includes a server 5 and a sound volume manager 6. In addition, each assistance data search device 10 includes a keyword manager 7, a search manager 8, and a determination manager 9.

(1-2) Configuration of the Communication Assistance Device

The communication assistance device 4 includes the server 5, the sound volume manager 6, an assistance data transmitter 100, and an assistance data receiver 102.

A voice detector 62 in the sound volume manager 6 receives communication data comprised of voice data from a video conference server 24 in the server 5. Here, the video conference server 24 receives communication data such as voice data, text data, and/or image data from terminals such as the user terminals 1 and the assistance data search devices 10 connected to the network 3.

The assistance data receiver 102 receives assistance data transmitted from the assistance data search device 10. At this point, the assistance data transmitted from the assistance data search device 10 is associated with the keywords extracted by the assistance data search devices 10, the IDs of the user terminals that transmitted those keywords, the time and date that the user terminals transmitted those keywords, the format of the assistance data, and the like. The assistance data transmitter 100 adjusts the sound volume based upon the aforementioned data on the assistance data, and transmits the assistance data to the user terminals 1.

Except for the aforementioned configuration, the configurations of the sound volume manager 6 and the assistance data transmitter 100 in this embodiment are the same as the configurations of the sound volume manager 6 and the assistance data transmitter 100 in the first embodiment.

(1-3) Configuration of the Assistance Data Search Device

Each assistance data search device 10 includes a receiver 30, the keyword manager 7, the search manager 8, the determination receiver 9, and an assistance data transmitter 108.

The determination manager 9 receives the keywords extracted by the keyword manager 7 and data on the user terminals that transmitted those keywords, together with the assistance data that was retrieved by the assistance data search unit 82. The assistance data transmitter 108 receives the format of the assistance data determined by the assistance data determination unit 92 and the degree of association determined by the degree of association determination unit 94 from the determination manager 9, and transmits this to the assistance data receiver 102 in the communication assistance device 4.

Except for the aforementioned configuration, the configurations of the receiver 30, sound volume manager 7, the search manager 8, and the determination manager 9 in this embodiment are the same as the configurations of the receiver 30, sound volume manager 7, the search manager 8, and the determination manager 9 in the first embodiment.

(2) Summary of the Communication Assistance Process in the Fourth Embodiment

Next, a summary of the process used in the video conference system according to the fourth embodiment will be described.

The sound detector 62 in the communication assistance device 4 detects the presence or absence of voice data. The keyword manager 7 in the assistance data search device 10 extracts keywords based upon the communication data received by the receiver 30 from the user terminals 1, and the search manager 8 retrieves assistance data. The assistance data transmitter 108 in the assistance data search device 10 transmits the assistance data to the communication assistance device 4. At this point, the assistance data is associated with data such as the format of the assistance data, the degree of association between the assistance data and the user terminals, and the like, and the keywords extracted from the keyword manager 7.

The assistance data receiver 102 in the communication assistance device 4 receives the assistance data from the assistance data transmitter 108. The sound volume adjustor 64 in the sound volume manager 6 adjusts the sound volume of the assistance data in response to the assistance data received from the assistance data receiver 102 and the data associated with the assistance data, and transmits this to the assistance data transmitter 100. The assistance data transmitter 100 transmits the assistance data to the user terminals 1.

Thus, by having the communication assistance device 4 adjust the sound volume, and having the assistance data search device 10 perform tasks such as extracting the keywords and retrieving assistance data, the processes noted above can be allocated such that parallel processing can occur.

Fifth Embodiment

Figure 20:
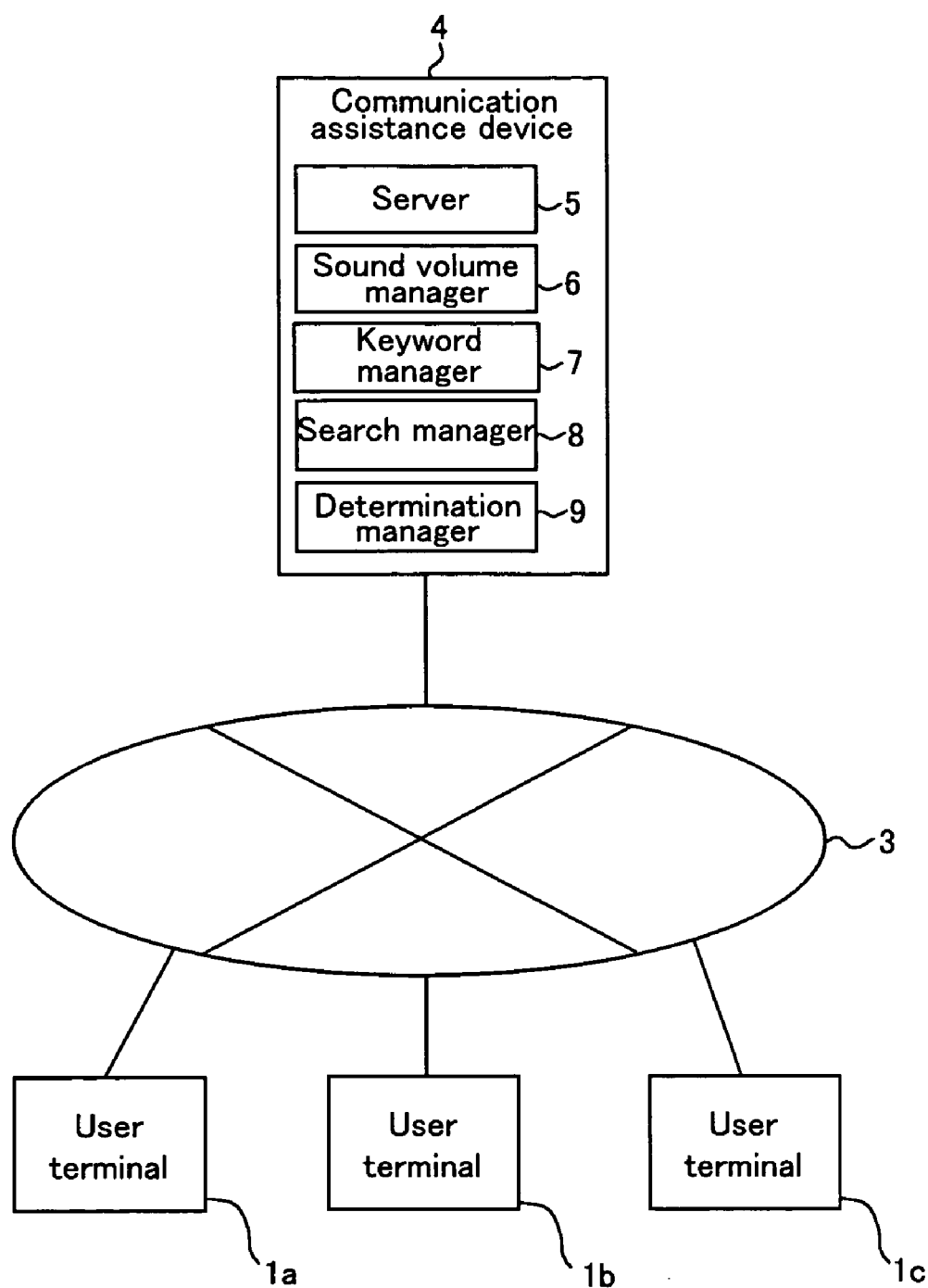
FIG. 20 shows the configuration of a video conference system according to a fifth embodiment of the present invention.
Figure 21:
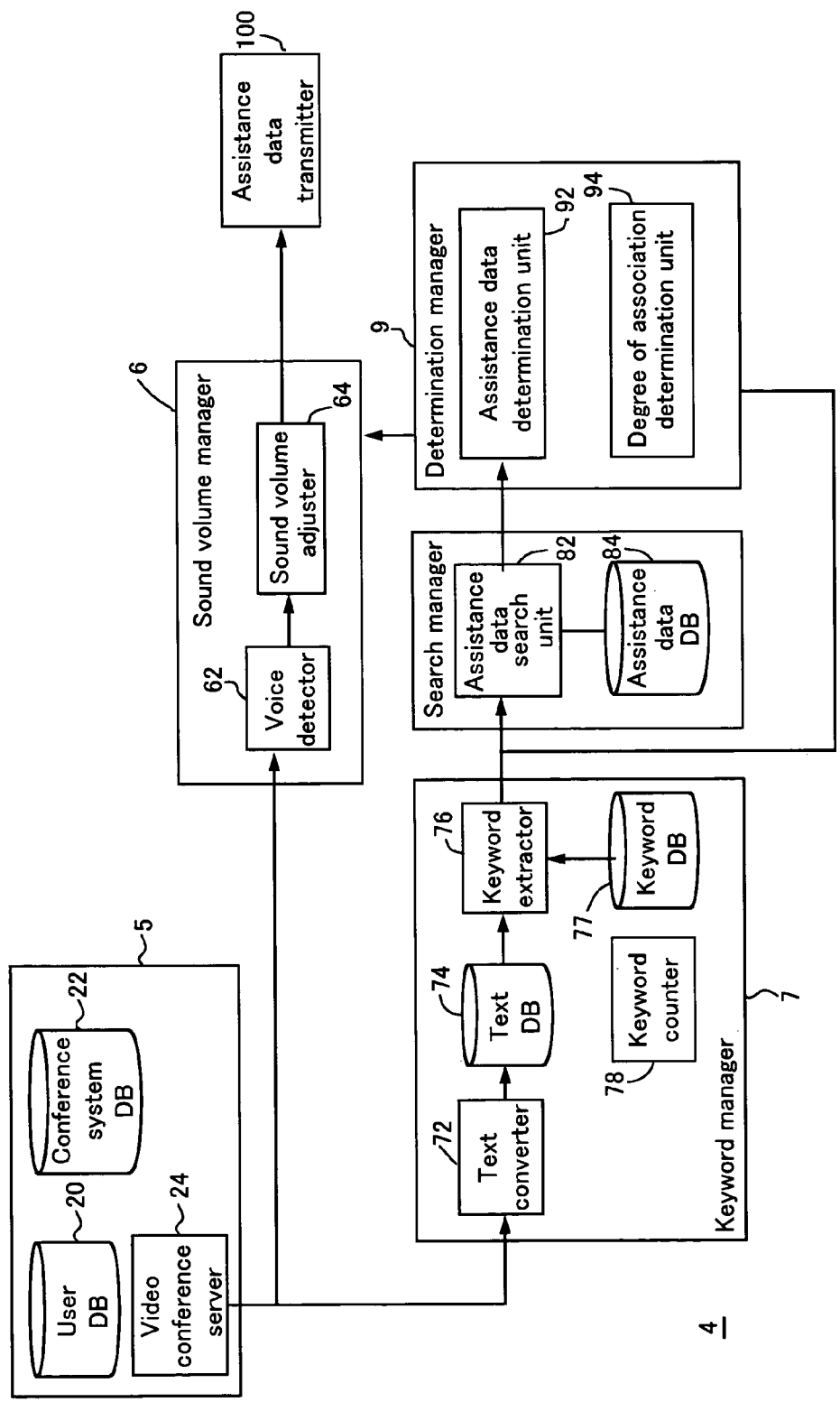
FIG. 21 shows an example of the configuration of a communication assistance device according to the fifth embodiment of the present invention.

FIGS. 20 and 21 will be employed to describe the configuration of a video conference system according to a fifth embodiment of the present invention. FIG. 20 shows the configuration of the video conference system according to the fifth embodiment, and FIG. 21 shows an example of a communication assistance device 4.

As shown in FIG. 20, the video conference system according to the fifth embodiment includes a plurality of user terminals 1 and a communication assistance device 4 connected together via a network 3. The communication assistance device 4 includes a sound volume manager 6, a keyword manager 7, a search manager 8, a determination manager 9, and an assistance data transmitter 100.

A voice detector 62 in the sound volume manager 6 receives communication data comprised of voice data from a video conference server 24 in the server 5. Here, the video conference server 24 receives communication data such as voice data, text data, and/or image data from terminals such as the user terminals 1 and the assistance data search devices 10 connected to the network 3. In addition, a text converter 72 of the keyword manager 7 receives communication data from the user terminals 1. Except for the aforementioned configuration, the configuration of the communication assistance device 4 in this embodiment is the same as the configuration of the communication assistance device in the first embodiment.

The communication assistance process in the communication assistance device 4 is identical to that described in the first embodiment, except that here the sound volume manager 6 and the keyword manager 7 receive communication data from the video conference server 24 in the server 5.

Thus, assistance data whose sound volume has been adjusted in the same way as in the first embodiment can be provided by only the communication assistance device 4.

Other Embodiments

A program that executes the aforementioned communication assistance process and a computer readable storage medium which stores the same are included in the present invention. Here, examples of the storage medium include computer readable floppy disks, hard disks, semiconductor memories, CD-ROMs, DVDs, magneto-optical disks, and the like.

This application claims priority to Japanese Patent Application No. 2003-021074. The entire disclosure of Japanese Patent Application No. 2003-021074 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A communication assistance process performed by a communication assistance device connected to a plurality of user terminals in a conference system, the communication assistance process comprising:

receiving communication data transmitted from the plurality of user terminals;

acquiring assistance data that serves to assist communication between the plurality of user terminals;

determining whether or not voice data is included in the received communication data;

determining whether or not voice data is included in the assistance data;

adjusting the sound volume of voice data in the assistance data if it was determined in the communication data determining that voice data is included in the communication data received from the plurality of user terminals, and it was determined in the assistance data determining that voice data is included in the assistance data; and providing assistance data that includes sound volume adjusted voice data to the plurality of user terminals.

2. The communication assistance process disclosed in claim 1, further comprising:

storing a vocabulary list; and comparing the vocabulary list with the communication data received in the communication data receiving, and extracting one or more keywords included in the vocabulary list from the communication data;

wherein assistance data that is associated with the keywords extracted in the keyword extracting is acquired in the assistance data acquiring.

3. The communication assistance process disclosed in claim 2, further comprising:

calculating an occurrence frequency of each keyword extracted in the keyword extracting; and extracting keywords having a high occurrence frequency from the keywords whose occurrence frequency was calculated in the frequency calculating;

wherein assistance data associated with the keywords having a high occurrence frequency is acquired from amongst assistance data associated with the keywords extracted in the keyword extracting.

4. The communication assistance process disclosed in claim 2, further comprising matching the keywords included in the vocabulary list with the assistance data and storing the same;
   wherein the assistance data acquiring includes searching for and retrieving assistance data that corresponds to each keyword extracted in the keyword extracting.

5. The communication assistance process disclosed in claim 1, wherein the assistance data is stored in a computer terminal which is connected to the network, and the assistance data is acquired from the computer terminal in the assistance data acquiring.

6. The communication assistance process disclosed in claim 1, wherein assistance data that includes text data and/or image data is provided to the user terminals in the assistance data providing if it was determined in the assistance data determining that the assistance data does not include voice data.

7. The communication assistance process disclosed in claim 1, wherein the sound volume of voice data in the communication data is measured in the communication data determining; and
   the sound volume of voice data in the assistance data is adjusted in the sound volume adjusting in response to the measurement results of the sound volume measurement.

8. The communication assistance process disclosed in claim 1, further comprising conducting a first evaluation in which the degree of association between the communication data received from the plurality of user terminals and the assistance data is evaluated; and
   wherein the sound volume of voice data in the assistance data to be provided to the plurality of user terminals is adjusted in the sound volume adjusting in response to the results of the first evaluation.

9. The communication assistance process disclosed in claim 1, further comprising conducting a second evaluation in which the degree of association between the communication data received from the plurality of user terminals and the assistance data is evaluated for each user terminal; and
   wherein the sound volume of voice data in the assistance data for each user terminal is adjusted in the sound volume adjusting in response to the results of the second evaluation.

10. The communication assistance process disclosed in claim 9, further comprising:
   storing a vocabulary list; and
   comparing the vocabulary list stored in the vocabulary list storing with the communication data received in the communication data receiving, and extracting one or more common keywords included in the communication data from each of the plurality of user terminals and the vocabulary list;
   wherein the degree of association with the assistance data is evaluated in the second evaluation based upon the transmission order of the common keywords from each user terminal; and
   the assistance data acquired in the assistance data acquiring is associated with the common keywords extracted in the common keyword extracting.

11. The communication assistance process disclosed in claim 9, further comprising:
   storing a vocabulary list; and
   comparing the vocabulary list stored in the vocabulary list storing with the communication data received in the communication data receiving, and extracting one or more common keywords included in the communication data from each of the plurality of user terminals and the vocabulary list; and
   calculating the transmission frequency of the common keywords for each user terminal;
   wherein the degree of association with the assistance data is evaluated in the second evaluation based upon the transmission frequency of the common keywords; and
   assistance data acquired in the assistance data acquiring is associated with the common keywords extracted in the common keyword extracting.

12. A communication assistance device connected to a plurality of user terminals in a conference system, the communication assistance device comprising:
   receiving means that receives communication data transmitted from the plurality of user terminals;
   assistance data acquisition means that acquires assistance data that serves to assist communication between the plurality of user terminals;
   communication data determination means that determines whether or not voice data is included in the received communication data;
   assistance data determination means that determines whether or not voice data is included in the assistance data;
   sound volume adjustment means that adjusts the sound volume of voice data in the assistance data if it was determined in the communication data determination means that voice data is included in the communication data received from the plurality of user terminals, and it was determined in the assistance data determination means that voice data is included in the assistance data; and
   assistance data provision means that provides assistance data that includes sound volume adjusted voice data to the plurality of user terminals.

13. A communication assistance program that is executed by a computer connected to a plurality of user terminals in a conference system, the communication assistance program causing the computer to function as:
   receiving means that receives communication data transmitted from the plurality of user terminals;
   assistance data acquisition means that acquires assistance data that serves to assist communication between the plurality of user terminals;
   communication data determination means that determines whether or not voice data is included in the received communication data;
   assistance data determination means that determines whether or not voice data is included in the assistance data;
   sound volume adjustment means that adjusts the sound volume of voice data in the assistance data if it was determined in the communication data determination means that voice data is included in the communication data received from the plurality of user terminals, and it was determined in the assistance data determination means that voice data is included in the assistance data; and assistance data provision means that provides assistance data that includes sound volume adjusted voice data to the plurality of user terminals.

14. A computer readable storage medium on which is stored a communication assistance program that is executed on a computer connected to a plurality of user terminals via a network in a conference system, the program executing:

receiving communication data transmitted from the plurality of user terminals;

acquiring assistance data that serves to assist communication between the plurality of user terminals;

determining whether or not voice data is included in the received communication data;

determining whether or not voice data is included in the assistance data;

adjusting the sound volume of voice data in the assistance data if it was determined in the communication data determining that voice data is included in the communication data received from the plurality of user terminals, and it was determined in the assistance data determining that voice data is included in the assistance data; and providing assistance data that includes sound volume adjusted voice data to the plurality of user terminals.

15. A communication assistance device connected to a plurality of user terminals in a conference system, the communication assistance device comprising:

a controller receiving communication data transmitted from the plurality of user terminals, acquiring assistance data that serves to assist communication between the plurality of user terminals, determining whether voice data is included in the received communication data, determining whether voice data is included in the assistance data, adjusting sound volume of voice data in the assistance data if it was determined that voice data is included in the communication data received from the plurality of user terminals, and it was determined that voice data is included in the assistance data, and providing assistance data that includes sound volume adjusted voice data to the plurality of user terminals.

* * * * *